US012499793B2

(12) United States Patent
Hwang et al.

(10) Patent No.: US 12,499,793 B2
(45) **Date of Patent: *Dec. 16, 2025**

(54) DISPLAY DEVICE

(71) Applicant: SAMSUNG DISPLAY CO., LTD., Yongin-si (KR)

(72) Inventors: Won Mi Hwang, Yongin-si (KR); Ji Su Na, Yongin-si (KR); Su Mi Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,709

(22) Filed: Aug. 12, 2024

(65) Prior Publication Data

US 2024/0404439 A1 Dec. 5, 2024

Related U.S. Application Data

(63) Continuation of application No. 18/462,105, filed on Sep. 6, 2023, now Pat. No. 12,062,308.

(30) Foreign Application Priority Data

Dec. 12, 2022 (KR) ........................ 10-2022-0172383

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0275* (2013.01); *G09G 2310/0297* (2013.01); *G09G 2330/12* (2013.01)

(58) Field of Classification Search
CPC ......... G02F 1/133514; G02F 1/136286; G02F 1/1368; G09G 2300/0426;
(Continued)

(56) References Cited

U.S. PATENT DOCUMENTS

2014/0300649 A1* 10/2014 Park ..................... G09G 3/3208
345/690
2018/0151106 A1* 5/2018 Peng .................... G09G 3/3666

FOREIGN PATENT DOCUMENTS

CN 110992877 A 4/2020
KR 10-2019-0071029 A 6/2019
KR 10-2357317 B1 1/2022

* cited by examiner

*Primary Examiner* — Insa Sadio
(74) *Attorney, Agent, or Firm* — Womble Bond Dickinson (US) LLP

(57) ABSTRACT

A display device includes a substrate, a circuit layer, a light emitting element layer, and a display driving circuit. The circuit layer comprises demux circuit units side by side in a demux area of a non-display area of the substrate and electrically connected between data lines and the display driving circuit, test signal supply lines in the non-display area and transmitting test signals for testing the lighting state of light emitting elements of the light emitting element layer, and test pad connection lines respectively electrically connected to test signal pads in the sub-area and extending to the non-display area. The test signal supply lines are electrically connected to the test pad connection lines through test line connection contact holes, respectively. The test line connection contact holes are in a test connection area which is a part of the demux area adjacent to the sub-area.

12 Claims, 20 Drawing Sheets

(58) Field of Classification Search
CPC ....... G09G 2300/0465; G09G 2300/08; G09G 2300/0804; G09G 2300/0814; G09G 2310/0202; G09G 2310/021; G09G 2310/0243; G09G 2310/0262; G09G 2310/0297; G09G 2380/02; G09G 3/20; G09G 3/2074; G09G 3/2096; G09G 3/3225; G09G 3/3266; G09G 3/3275; G09G 3/3607; G09G 3/3666; G09G 3/3677; G09G 3/3688
See application file for complete search history.

DL: DL1, DL2, DL3, DL4
DETL : DETL1, DETL2, DETL3
DML1 : DETL1, DETL3, ASL1
DML2 : DETL2, ASL2
CDL4 : DML2, VDAL
CDL5 : DL, DML1

SEL: CHDT, SDT, DDT, CH1-1, S1-1, D1-1,CH1-2, S1-2, D1-2, CH2, S2, D2, CH3-1, S3-1, D3-1,CH3-2, S3-2, D3-2, CH4, S4, D4, CH5, S5, D5, CH6, S6, D6

CDL1: GWL, GIL, ECL, GCL, GDT, G1-1, G1-2, G2, G3-1, G3-2, G4, G5, G6

CDL2: VDSBL1, VGIL, VAIL, SHE

CDL3: VDSBL2, VGIAL, VAIAL, CE1, CE2, CE3

VDL: VDSBL1, VDSBL2

DL: DL1, DL2
DML1 : DETL1, DETL3, ASL1
DML2 : DETL2, ASL2
CDL4: DML2, VDAL, CE5, CE6
CDL5: DL, DML1, CE6

TCNL : TCNL1~6
TSML : TDSPL1~3, TCSPL1~3
TSSPL : YSML, TSSL1~6

DXTR1 : DXTC1, DXTS, DXTD1 DXTG1
DXTR2 : DXTC2, DXTS, DXTD2, DXTG2
TCTR : TCTR1~3
TCNL : TCNL1~6

TCTR : TCTR1~3
TCNL : TCNL1~6
TSML : TDSPL1~3, TCSPL1~3

TCTR : TCTR1~3
TCNL : TCNL1~6
TSML : TDSPL1~3, TCSPL1~3
TSSL : TSSL1~6
TSSPL : YSML, TSSL1~6

DISPLAY DEVICE

CROSS-REFERENCE TO RELATED APPLICATIONS

The application is a continuation of U.S. patent application Ser. No. 18/462,105, filed Sep. 6, 2023, which claims priority to and the benefit of Korean Patent Application No. 10-2022-0172383, filed Dec. 12, 2022, the entire content of both of which is incorporated herein by reference.

BACKGROUND

1. Field

Aspects of some embodiments of the present disclosure relate to a display device.

2. Description of the Related Art

As the information society develops, consumer demand for display devices for displaying images is increasing in various forms and for various applications. For example, display devices may be applied to or utilized in various electronic devices such as smartphones, digital cameras, notebook computers, navigation devices, and smart televisions.

A display device may include a display panel that emits light for displaying images and a driver that supplies signals or power for driving the display panel.

At least one surface of the display device may be referred to as a display surface on which images are displayed. The display surface may include a display area in which a plurality of emission areas emitting light for displaying images are arranged and a non-display area around the display area.

The display device may include data lines in the display area that transmit data signals to the emission areas and a display driving circuit supplying the data signals to the data lines, respectively.

The above information disclosed in this Background section is only for enhancement of understanding of the background and therefore the information discussed in this Background section does not necessarily constitute prior art.

SUMMARY

A display device may include connection lines for electrical connection between the data lines and the display driving circuit, respectively. The connection lines may be located in the non-display area. Therefore, it may be difficult to reduce a width of the non-display area because the number of connection lines increases as the number of data lines is increased to increase size or improve resolution.

Alternatively, if the width of the non-display area is reduced to increase the proportion of the display area in the display surface, a distance between the connection lines may be reduced, which may increases short-circuit defects.

According to some embodiments of the present disclosure, a display device in which a width of a non-display area can be reduced without a reduction in resolution or an increase in short-circuit defects.

However, characteristics of embodiments according to the present disclosure are not restricted to the one set forth herein. The above and other aspects of the present disclosure will become more apparent to one of ordinary skill in the art to which the present disclosure pertains by referencing the detailed description of the present disclosure given below.

According to some embodiments of the present disclosure, there is provided a display device which comprises a substrate comprising a main area, which comprises a display area in which emission areas are arranged and a non-display area around the display area, and a sub-area protruding from a side of the main area, a circuit layer on the substrate and comprising pixel drivers respectively corresponding to the emission areas and data lines transmitting data signals to the pixel drivers, a light emitting element layer on the circuit layer and comprising light emitting elements corresponding to the emission areas, respectively, and a display driving circuit on the sub-area of the substrate and supplying data driving signals corresponding to the data lines. According to some embodiments, the circuit layer further comprises demultiplexer (demux) circuit units side by side in a demux area of the non-display area and electrically connected between the data lines and the display driving circuit, test signal supply lines in the non-display area and respectively transmitting test signals for testing the lighting state of the light emitting elements, and test pad connection lines respectively electrically connected to test signal pads in the sub-area and extending to the non-display area. According to some embodiments, the test signal supply lines are electrically connected to the test pad connection lines through test line connection contact holes, respectively. According to some embodiments, the test line connection contact holes are in a test connection area which is a part of the demux area adjacent to the sub-area.

According to some embodiments, the demux circuit units are arranged in a first direction. According to some embodiments, a test signal supply line of the test signal supply lines comprises a test signal main line in a test line area of the non-display area between the display area and the demux area and extending in the first direction, and a test signal sub-line electrically connecting one of the test pad connection lines and the test signal main line and extending in a second direction intersecting the first direction. According to some embodiments, the test signal sub-line is electrically connected to the one of the test pad connection lines through one of the test line connection contact holes and electrically connected to the test signal main line through a test line auxiliary contact hole in the test line area.

According to some embodiments, each of the demux circuit units comprises an input terminal to which a data driving signal of the display driving circuit is input, two or more output terminals from which two or more data signals corresponding to the data driving signal are output, respectively, and two or more demux transistors electrically connected between the two or more output terminals and the input terminal, respectively. According to some embodiments, the circuit layer further comprises output connection lines in the demux area and the test line area, extending in the second direction and electrically connecting the output terminals of the demux circuit units and the data lines, respectively, and two or more demux control lines electrically connected to gate electrodes of the two or more demux transistors, respectively.

According to some embodiments, the test signal main lines comprise a test data supply line transmitting a test data signal for a lighting test, and a test control supply line transmitting a test control signal for controlling whether to transmit the test data signal. According to some embodiments, the circuit layer further comprises test control transistors in the test line area, electrically connected between the data lines and the test data supply line, respectively, and turned on based on the test control signal of the test control supply line.

According to some embodiments, the emission areas comprise a first emission area emitting light of a first color, a second emission area emitting light of a second color in a wavelength band lower than that of the first color, and a third emission area emitting light of a third color in a wavelength band lower than that of the second color. According to some embodiments, the test signal main lines comprise a first test data supply line transmitting a first test data signal for testing the lighting of the first emission area, a second test data supply line transmitting a second test data signal for testing the lighting of the second emission area, a third test data supply line transmitting a third test data signal for testing the lighting of the third emission area, a first test control supply line transmitting a first test control signal for controlling whether to transmit the first test data signal, a second test control supply line transmitting a second test control signal for controlling whether to transmit the second test data signal, and a third test control supply line transmitting a third test control signal for controlling whether to transmit the third test data signal. According to some embodiments, the circuit layer further comprises a first test control transistor between a data line connected to a pixel driver of the first emission area and the first test data supply line and turned on by the first test control signal of the first test control supply line, a second test control transistor between a data line connected to a pixel driver of the second emission area and the second test data supply line and turned on by the second test control signal of the second test control supply line, and a third test control transistor between a data line connected to a pixel driver of the third emission area and the third test data supply line and turned on by the third test control signal of the third test control supply line.

According to some embodiments, the test pad connection lines comprise a first test pad connection line transmitting the first test data signal, a second test pad connection line transmitting the second test data signal, a third test pad connection line transmitting the third test data signal, a fourth test pad connection line transmitting the first test control signal, a fifth test pad connection line transmitting the second test control signal, and a sixth test pad connection line transmitting the third test control signal. According to some embodiments, the test signal supply lines further comprise a first test signal sub-line electrically connecting the first test data supply line and the first test pad connection line, a second test signal sub-line electrically connecting the second test data supply line and the second test pad connection line, a third test signal sub-line electrically connecting the third test data supply line and the third test pad connection line, a fourth test signal sub-line electrically connecting the first test control supply line and the fourth test pad connection line, a fifth test signal sub-line electrically connecting the second test control supply line and the fifth test pad connection line, and a sixth test signal sub-line electrically connecting the third test control supply line and the sixth test pad connection line.

According to some embodiments, the circuit layer comprises a semiconductor layer on the substrate, a first conductive layer on a first gate insulating layer covering the semiconductor layer, a second conductive layer on a second gate insulating layer covering the first conductive layer, a third conductive layer on an interlayer insulating layer covering the second conductive layer, a fourth conductive layer on a first planarization layer covering the third conductive layer flat, a fifth conductive layer on a second planarization layer covering the fourth conductive layer flat, and a third planarization layer covering the fifth conductive layer flat. According to some embodiments, the data lines are comprised in the fifth conductive layer. According to some embodiments, the test signal main line of each of the test signal supply lines is comprised in the third conductive layer or the fourth conductive layer. According to some embodiments, the test signal sub-line of each of the test signal supply lines is comprised in the fourth conductive layer. According to some embodiments, the test pad connection lines are comprised in the first conductive layer or the second conductive layer.

According to some embodiments, the circuit layer further comprises a first power supply line and a second power supply line in the non-display area and respectively transmitting a first power voltage and a second power voltage for driving the light emitting elements. According to some embodiments, the second power supply line is comprised in the fourth conductive layer or the fifth conductive layer. According to some embodiments, the gate electrodes of the two or more demux transistors are comprised in the first conductive layer or the second conductive layer. According to some embodiments, the demux control lines are comprised in the third conductive layer. According to some embodiments, a portion of the second power supply line is in the demux area and overlaps a portion of each of the demux circuit units and the demux control lines.

According to some embodiments, the test line connection contact holes overlap the second power supply line.

According to some embodiments, the demux area comprises a demux middle area in the middle in the first direction, a first demux side area adjacent to an edge of the substrate in the first direction, and a second demux side area between the demux middle area and the first demux side area in the first direction. According to some embodiments, the demux circuit units comprise a first demux circuit unit in the first demux side area, and a second demux circuit unit in the second demux side area. According to some embodiments, the circuit layer further comprises circuit output lines electrically connected to the display driving circuit and extending to the demux area, an input connection line in the non-display area and electrically connected to an input terminal of the first demux circuit unit, and an input detour line in the display area and electrically connecting a first circuit output line among the circuit output lines and the input connection line. According to some embodiments, a second circuit output line among the circuit output lines is electrically connected to an input terminal of the second demux circuit unit. According to some embodiments, the first circuit output line is adjacent to the second circuit output line in the demux area.

According to some embodiments, the test connection area is a part of the first demux side area and between two first demux circuit units.

According to some embodiments, the data lines extend in the second direction. According to some embodiments, the input detour line comprises a first detour line electrically connected to the first circuit output line and extending in the second direction, a second detour line electrically connected to the first detour line and extending in the first direction, and a third detour line electrically connected to the second detour line and extending in the second direction toward the demux area.

According to some embodiments, the first detour line and the third detour line are comprised in the fifth conductive layer, and the second detour line is comprised in the fourth conductive layer.

According to some embodiments, the display area comprises a display middle area adjacent to the demux middle area in the second direction, a first display side area adjacent to the first demux side area in the second direction, and a second display side area adjacent to the second demux side area in the second direction. According to some embodiments, the circuit layer further comprises first dummy lines in the display area, neighboring the data lines, respectively, extending in the second direction and comprised in the fifth conductive layer. According to some embodiments, the first dummy lines comprise the first detour line, the third detour line, and first auxiliary lines other than the first detour line and the third detour line.

According to some embodiments, the circuit layer further comprises first power auxiliary lines in the display area, extending in the first direction, comprised in the fourth conductive layer and electrically connected to the first power supply line, and second dummy lines in the display area, extending in the first direction, comprised in the fourth conductive layer and neighboring the first power auxiliary lines, respectively. According to some embodiments, the second dummy lines comprise the second detour line, and second auxiliary lines other than the second detour line. According to some embodiments, the first auxiliary lines and the second auxiliary lines are electrically connected to the second power supply line.

According to some embodiments, there is provided a display device which comprises a substrate comprising a main area, which comprises a display area in which emission areas are arranged and a non-display area around the display area, and a sub-area protruding from a side of the main area, a circuit layer on the substrate and comprising pixel drivers respectively corresponding to the emission areas and data lines transmitting data signals to the pixel drivers, a light emitting element layer on the circuit layer and comprising light emitting elements corresponding to the emission areas, respectively, and a display driving circuit on the sub-area of the substrate and supplying data driving signals corresponding to the data lines. According to some embodiments, the circuit layer further comprises demux circuit units arranged in a demux area of the non-display area in a first direction and electrically connected between the data lines and the display driving circuit, circuit output lines electrically connected to the display driving circuit and extending to the demux area, test signal supply lines in the non-display area and respectively transmitting test signals for testing the lighting state of the light emitting elements, and test pad connection lines respectively electrically connected to test signal pads in the sub-area and extending to the non-display area. According to some embodiments, the demux area comprises a demux middle area in the middle in the first direction, a first demux side area adjacent to an edge of the substrate in the first direction, and a second demux side area between the demux middle area and the first demux side area in the first direction. According to some embodiments, a first demux circuit unit in the first demux side area among the demux circuit units is electrically connected to a first circuit output line among the circuit output lines through an input connection line in the non-display area and an input detour line in the display area. According to some embodiments, the test signal supply lines are electrically connected to the test pad connection lines through test line connection contact holes, respectively. According to some embodiments, the test line connection contact holes are in a test connection area which is a part of the first demux side area.

According to some embodiments, a test signal supply line of the test signal supply lines comprises a test signal main line in a test line area of the non-display area between the display area and the demux area and extending in the first direction, and a test signal sub-line electrically connecting one of the test pad connection lines and the test signal main line and extending in a second direction intersecting the first direction. According to some embodiments, the test signal sub-line is electrically connected to the one of the test pad connection lines through one of the test line connection contact holes and electrically connected to the test signal main line through a test line auxiliary contact hole in the test line area.

According to some embodiments, the circuit layer further comprises a first power supply line and a second power supply line in the non-display area and respectively transmitting a first power voltage and a second power voltage for driving the light emitting elements. According to some embodiments, a portion of the second power supply line is in the demux area and overlaps a portion of each of the demux circuit units and the demux control lines. According to some embodiments, the test line connection contact holes overlap the second power supply line.

According to some embodiments, each of the demux circuit units comprises an input terminal to which a data driving signal of the display driving circuit is input, two or more output terminals from which two or more data signals corresponding to the data driving signal are output, respectively, and two or more demux transistors electrically connected between the two or more output terminals and the input terminal, respectively. According to some embodiments, the circuit layer further comprises output connection lines in the demux area and the test line area, extending in the second direction and electrically connecting the output terminals of the demux circuit units and the data lines, respectively, and two or more demux control lines electrically connected to gate electrodes of the two or more demux transistors, respectively.

According to some embodiments, the test signal main lines of the test signal supply lines comprise a test data supply line transmitting a test data signal for a lighting test, and a test control supply line transmitting a test control signal for controlling whether to transmit the test data signal, and the circuit layer further comprises test control transistors in the test line area, electrically connected between the data lines and the test data supply line, respectively, and turned on based on the test control signal of the test control supply line.

According to some embodiments, the demux circuit units further comprise a second demux circuit unit in the second demux side area. According to some embodiments, a second circuit output line among the circuit output lines is electrically connected to an input terminal of the second demux circuit unit. According to some embodiments, first circuit output line is adjacent to the second circuit output line in the demux area.

According to some embodiments, the data lines extend in the second direction. According to some embodiments, the display area comprises a display middle area adjacent to the demux middle area in the second direction, a first display side area adjacent to the first demux side area in the second direction, and a second display side area adjacent to the second demux side area in the second direction. According to some embodiments, the input detour line comprises a first detour line in the second display side area, electrically connected to the first circuit output line and extending in the second direction, a second detour line electrically connected to the first detour line and extending in the first direction, and a third detour line in the first display side area, electrically connected to the second detour line and extending in the second direction toward the demux area.

A display device according to some embodiments includes a substrate including a main area, which includes a display area and a non-display area, and a sub-area protruding from a side of the main area, a circuit layer on the substrate, a light emitting element layer on the circuit layer, and a display driving circuit supplying data driving signals corresponding to data lines of the circuit layer.

According to some embodiments, the circuit layer includes pixel drivers respectively corresponding to emission areas, the data lines transmitting data signals to the pixel drivers, demux circuit units in a demux area of the non-display area and electrically connected between the data lines and the display driving circuit, test signal supply lines in a test line area of the non-display area and respectively transmitting test signals for testing the lighting of light emitting elements, and test pad connection lines electrically connected to test signal pads in the sub-area, respectively.

According to some embodiments, the test signal supply lines are electrically connected to the test pad connection lines through test line connection contact holes, respectively, and the test line connection contact holes are in a test connection area which is a part of the demux area adjacent to the sub-area.

Because the display device according to some embodiments includes the demux circuit units connected between the display driving circuit and the data lines as described above, an output terminal of the display driving circuit is not directly connected to the data lines, but is connected to the demux circuit units which are smaller in number than the data lines. Therefore, the number of circuit output lines electrically connected to the display driving circuit and extending to the demux area may be less than the number of data lines. Accordingly, a width of the non-display area can be relatively reduced.

Therefore, because the width of the non-display area can be reduced without a reduction in the number of data lines, resolution limitation due to the reduction in the width of the non-display area can be eliminated.

In addition, because the demux circuit units are electrically connected between the data lines and the display driving circuit, the test connection area adjacent to the sub-area can be easily provided in the demux area of the non-display area by adjusting a distance between the demux circuit units. Accordingly, the test line connection contact holes for electrically connecting the test signal supply lines and the test pad connection lines, respectively, may be in the test connection area of the demux area. Therefore, even if the test pad connection lines do not extend to both ends of the demux area, they can be electrically connected to the test signal supply lines of the test line area, respectively.

Therefore, because the test pad connection lines do not extend toward edges of the substrate, a width of an area allocated to the arrangement of the test pad connection lines may be reduced, which, in turn, reduces the width of the non-display area.

In addition, according to some embodiments, the demux area may include a demux middle area in the middle in a first direction, a first demux side area adjacent to an edge of the substrate in the first direction, and a second demux side area between the demux middle area and the first demux side area in the first direction. The demux circuit units may include a first demux circuit unit in the first demux side area and a second demux circuit unit in the second demux side area.

The circuit layer may further include circuit output lines electrically connected to the display driving circuit, an input connection line electrically connected to an input terminal of the first demux circuit unit, and an input detour line in the display area and electrically connecting the input connection line and a first circuit output line. That is, the input terminal of the first demux circuit unit of the first demux side area adjacent to the edge of the substrate may not be directly electrically connected to the first circuit output line of the display driving circuit, but may be electrically connected to the first circuit output line through the input detour line of the display area and the input connection line electrically connected to the input detour line. Accordingly, the first circuit output line does not extend toward the input terminal of the first demux circuit unit. That is, the first circuit output line may not be in the first demux side area. Therefore, a width of the first demux side area including a portion bent along the edge of the substrate in the non-display area may be reduced, which, in turn, reduces the width of the non-display area.

Furthermore, because the first circuit output line is not in the first demux side area, the test connection area can be easily provided as a part of the first demux side area only by adjusting a distance between first demux circuit units regardless of the first circuit output line.

The characteristics of embodiments according to the present disclosure are not limited to the aforementioned effects, and various other characteristics are included in the present specification.

BRIEF DESCRIPTION OF THE DRAWINGS

These and/or other aspects will become more apparent and more readily appreciated from the following description of the embodiments, taken in conjunction with the accompanying drawings in which.

DETAILED DESCRIPTION

Figure 1:
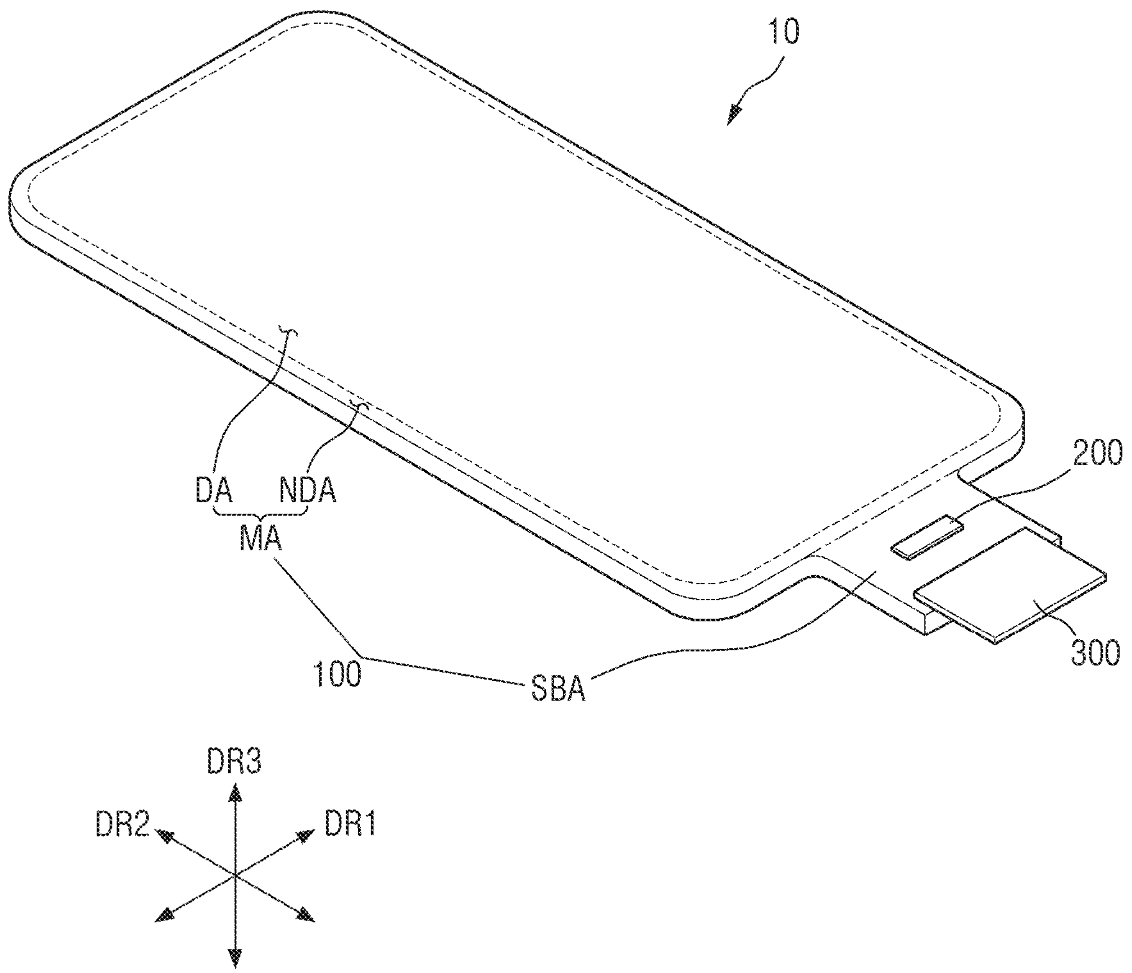
FIG. 1 is a perspective view of a display device according to some embodiments.

Aspects of some embodiments will now be described more fully hereinafter with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, aspects of some embodiments will now be described with reference to the accompanying drawings.

Figure 2:
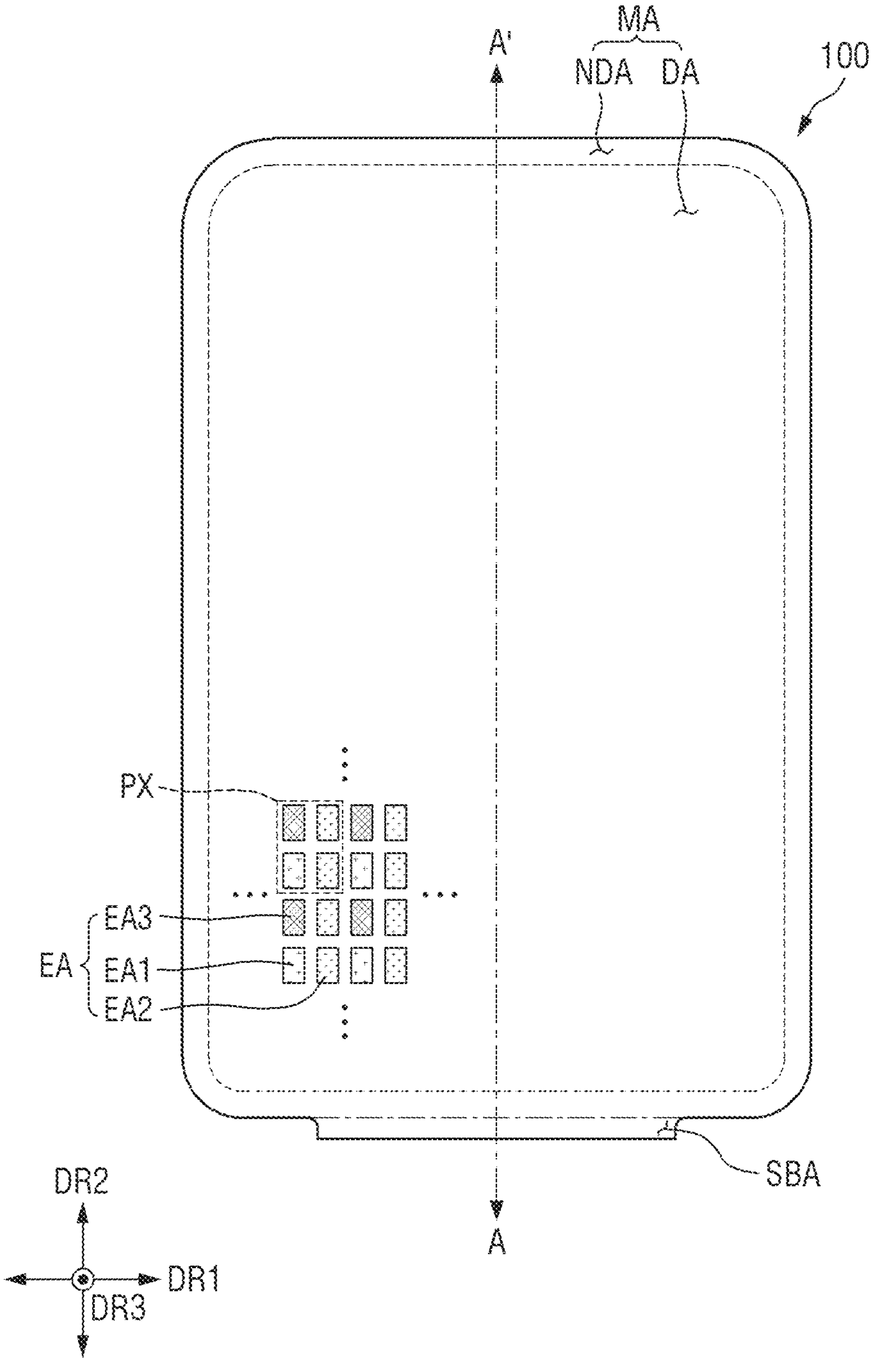
FIG. 2 is a plan view of the display device of FIG. 1 according to some embodiments.
Figure 3:
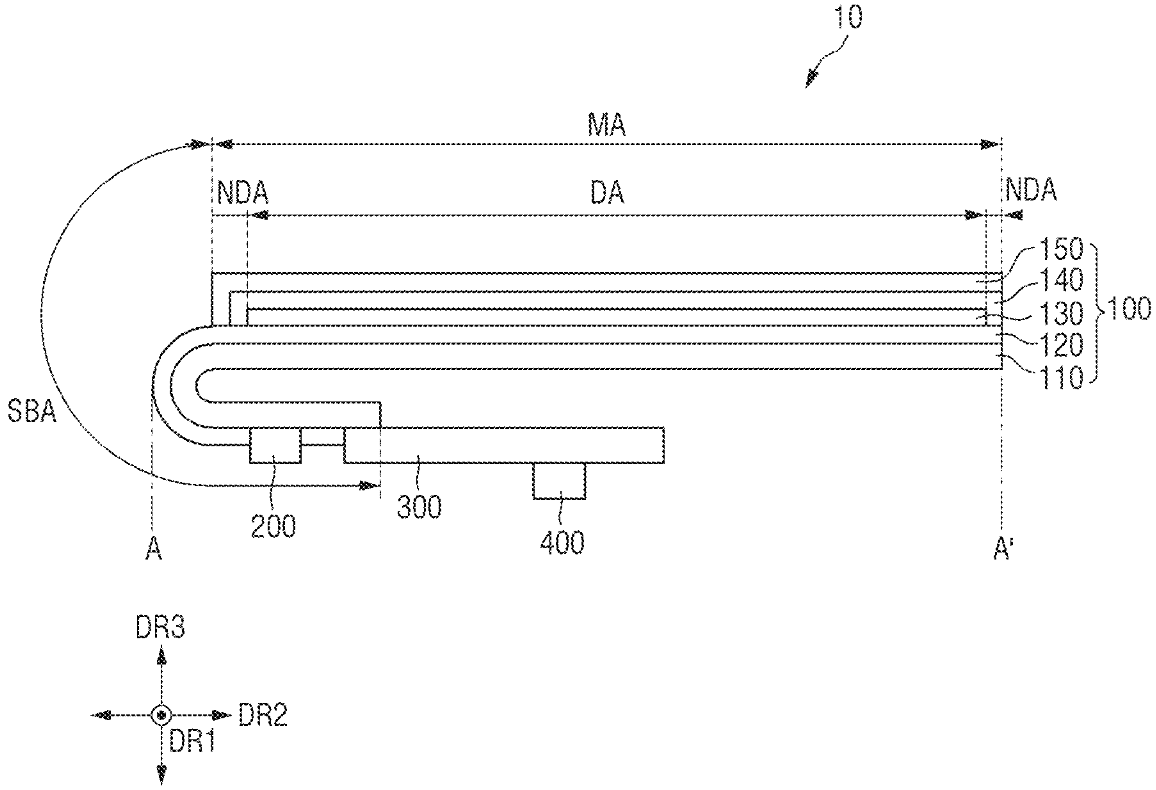
FIG. 3 is a cross-sectional view of an example of a plane cut along the line A-A' of FIG. 2 according to some embodiments.
Figure 4:
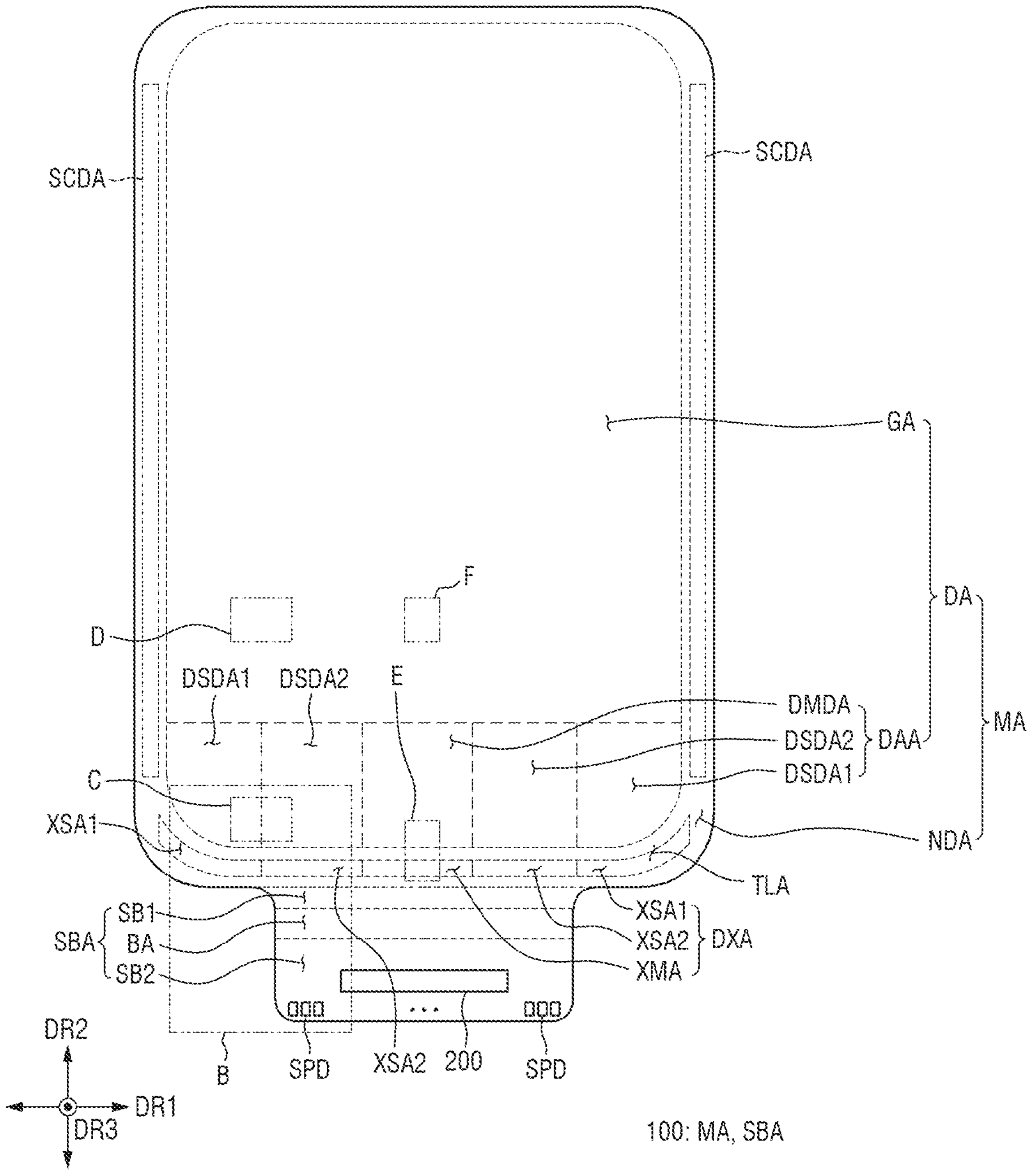
FIG. 4 is a plan view of a main area and a sub-area of the display device of FIG. 1 according to some embodiments.

FIG. 1 is a perspective view of a display device 10 according to some embodiments. FIG. 2 is a plan view of the display device 10 of FIG. 1. FIG. 3 is a cross-sectional view of an example of a plane cut along the line A-A' of FIG. 2. FIG. 4 is a plan view of a main area MA and a sub-area SBA of the display device 10 of FIG. 1.

Referring to FIG. 1, the display device 10 is a device for displaying moving images (e.g., video images) or still images (e.g., static images). The display device 10 may be used as a display screen in portable electronic devices such as (but not limited to) mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products such as televisions, notebook computers, monitors, billboards and Internet of things (IoT) devices.

The display device 10 may be a light emitting display device such as an organic light emitting display device using an organic light emitting diode, a quantum dot light emitting display device including a quantum dot light emitting layer, an inorganic light emitting display device including an inorganic semiconductor, or a micro- or nano-light emitting display device using a micro- or nano-light emitting diode. A case where the display device 10 is an organic light emitting display device will be mainly described below. However, embodiments according to the present disclosure are not limited to this case and is also applicable to display devices including an organic insulating material, an organic light emitting material, and a metal material.

The display device 10 may be formed flat, but embodiments according to the present disclosure are not limited thereto. For example, the display device 10 may include curved portions formed at left and right ends and having a constant or varying curvature. In addition, the display device 10 may be formed to be flexible so that it can be curved, bent, folded, or rolled without damaging the functionality of the display device 10.

The display device 10 may include a display panel 100, a display driving circuit 200, and a circuit board 300.

The display panel 100 includes a display area DA in which a plurality of emission areas EA (see FIG. 2) for displaying an image are arranged.

That is, a substrate 110 (see FIG. 3) of the display panel 100 may include the main area MA, which includes the display area DA and a non-display area NDA arranged around (e.g., in a periphery or outside a footprint of) the display area DA, and the sub-area SBA protruding from a side of the main area MA in a second direction DR2.

The display driving circuit 200 may be provided as an integrated circuit and mounted in the sub-area SBA. The display driving circuit 200 may supply data driving signals corresponding to data lines DL (see FIGS. 5 through 11) of the display panel 100.

The circuit board 300 may be bonded to signal pads SPD (see FIG. 4) located on an edge of the sub-area SBA.

In FIGS. 1 and 4, the sub-area SBA is spread out parallel to the main area MA. On the other hand, in FIG. 2, a portion of the sub-area SBA is bent.

Referring to FIG. 2, the display area DA may be shaped like a rectangular plane having short sides in a first direction DR1 and long sides in the second direction DR2 intersecting the first direction DR1. Each corner where a short side extending in the first direction DR1 meets a long side extending in the second direction DR2 may be rounded with a predetermined curvature or may be right-angled. The planar shape of the display area DA is not limited to a quadrilateral shape but may also be another polygonal shape, a circular shape, or an oval shape.

The display area DA may occupy most of the main area MA. The display area DA may be located in a center of the main area MA.

The display area DA may include a plurality of emission areas EA arranged side by side each other. In addition, the display area DA may further include a non-emission area NEA (see FIG. 14) between the emission areas EA.

The emission areas EA may be arranged side by side each other in the first direction DR1 and the second direction DR2.

Each of the emission areas EA may have a rhombic planar shape or a rectangular planar shape. However, this is only an example, and the planar shape of each of the emission areas EA according to some embodiments is not limited to that illustrated in FIG. 2. That is, the emission areas EA may also have a polygonal shape other than a quadrilateral shape, a circular shape, or an oval shape in a plan view.

The emission areas EA may include first emission areas EA1 emitting light of a first color in a predetermined wavelength band, second emission areas EA2 emitting light of a second color in a wavelength band lower than that of the first color, and third emission areas EA3 emitting light of a third color in a wavelength band lower than that of the second color.

For example, the first color may be red in a wavelength band of approximately 600 to 750 nm, the second color may be green in a wavelength band of approximately 480 to 560 nm and the third color may be blue in a wavelength band of approximately 370 to 460 nm As illustrated in FIG. 2, the first emission areas EA1 and the third emission areas EA3 may be alternately arranged in the first direction DR1 or the second direction DR2. In addition, the second emission areas EA2 may be arranged side by side with each other in the first direction DR1 or the second direction DR2.

A plurality of pixels PX displaying respective luminances and colors may be provided by the emission areas EA. Each of the pixels PX may be a basic unit that displays various colors including white with a predetermined luminance.

That is, each of the pixels PX may be composed of at least one first emission area EA1, at least one second emission area EA2, and at least one third emission area EA3 adjacent to each other.

Each of the pixels PX may display the color and luminance of a mixture of light emitted from at least one first emission area EA1, at least one second emission area EA2, and at least one third emission area EA3 adjacent to each other.

Although the emission areas EA have the same area in FIG. 2, this is only an example. In another example, the third emission areas EA3 may have the largest area, and the second emission areas EA2 may have the smallest area.

In addition, although the emission areas EA are arranged side by side in the first direction DR1 and the second direction DR2 in FIG. 2, this is only an example. In another example, the second emission areas EA2 may neighbor the first emission areas EA1 and the third emission areas EA3 in a diagonal direction intersecting the first direction DR1 and the second direction DR2.

Referring to FIG. 3, the display panel 100 of the display device 10 includes the substrate 110 including the main area MA and the sub-area SBA, a circuit layer 120 located on the substrate 110, and a light emitting element layer 130 located on the circuit layer 120.

The circuit layer 120 includes a plurality of pixel drivers PXD (see FIGS. 10 and 11) respectively corresponding to the emission areas EA and the data lines DL (see FIGS. 5 through 12) transmitting data signals to the pixel drivers PXD.

The light emitting element layer 130 includes a plurality of light emitting elements LEL (see FIGS. 10, 11 and 14) corresponding to the emission areas EA, respectively. The light emitting elements LEL may be electrically connected to the pixel drivers PXD of the circuit layer 120, respectively.

In addition, the display panel 100 of the display device 10 may further include a sealing layer 140 covering the light emitting element layer 130 and a sensor electrode layer 150 located on the sealing layer 140.

The substrate 110 may be made of an insulating material such as polymer resin. For example, the substrate 110 may be made of polyimide. The substrate 110 may be a flexible substrate that can be bent, folded, or rolled.

Alternatively, the substrate 110 may be made of an insulating material such as glass.

The sealing layer 140 is located on the circuit layer 120, corresponds to the main area MA, and covers the light emitting element layer 130. The sealing layer 140 may have a structure in which two or more inorganic layers and at least one organic layer are alternately stacked.

The sensor electrode layer 150 may be located on the sealing layer 140 and may correspond to the main area MA. The sensor electrode layer 150 may include touch electrodes for sensing a touch of a person or an object.

The display device 10 may further include a cover window located on the sensor electrode layer 150. The cover window may be attached onto the sensor electrode layer 150 by a transparent adhesive member such as an optically clear adhesive (OCA) film or an optically clear resin (OCR). The cover window may be an inorganic material such as glass or may be an organic material such as plastic or a polymer material. The cover window may protect the sensor electrode layer 150, the sealing layer 140, the light emitting element layer 130, and the circuit layer 120 from electrical and physical impacts on a display surface.

In addition, the display device 10 may further include an anti-reflection member located between the sensor electrode layer 150 and the cover window. The anti-reflection member may be a polarizing film or a color filter. The anti-reflection member may block external light that is reflected by the sensor electrode layer 150, the sealing layer 140, the light emitting element layer 130, the circuit layer 120, and interfaces between them, thereby preventing a reduction in visibility of an image of the display device 10.

The display device 10 according to some embodiments may further include a touch driving circuit 400 for driving the sensor electrode layer 150.

The touch driving circuit 400 may be provided as an integrated circuit.

The touch driving circuit 400 may be mounted on the circuit board 300 bonded to the signal pads SPD and thus may be electrically connected to the sensor electrode layer 150.

Alternatively, like the display driving circuit 200, the touch driving circuit 400 may be mounted on a second sub-area SB2 of the substrate 110.

The touch driving circuit 400 may transmit a touch driving signal to a plurality of driving electrodes included in the sensor electrode layer 150, receive touch sensing signals of a plurality of touch nodes through a plurality of sensing electrodes, respectively, and detect amounts of charge change in mutual capacitance based on the touch sensing signals.

That is, the touch driving circuit 400 may determine whether a user's touch or proximity has occurred based on the touch sensing signal of each of the touch nodes. The user's touch indicates that an object such as the user's finger or a pen directly touches a front surface of the display device 10. The user's proximity indicates that an object such as the user's finger or a pen hovers above the front surface of the display device 10.

Referring to FIG. 4, the sub-area SBA may include a bending area BA which is transformed into a bent shape and a first sub-area SB1 and the second sub-area SB2 which contact both sides of the bending area BA.

The first sub-area SB1 is located between the main area MA and the bending area BA. A side of the first sub-area SB1 may contact the non-display area NDA of the main area MA, and the other side of the first sub-area SB1 may contact the bending area BA.

The second sub-area SB2 is spaced apart from the main area MA with the bending area BA interposed between them and is located on a lower surface of the substrate 110 due to the bending area BA transformed into a bent shape. That is, the second sub-area SB2 may overlap the main area MA in a thickness direction DR3 of the substrate 110 due to the bending area BA transformed into a bent shape.

A side of the second sub-area SB2 may contact the bending area BA.

The signal pads SPD and the display driving circuit 200 may be located in the second sub-area SB2.

The display driving circuit 200 may generate signals and voltages for driving the pixel drivers PXD of the display area DA.

The display driving circuit 200 may be provided as an integrated circuit and mounted on the second sub-area SB2 of the substrate 110 by a chip on glass (COG) method, a chip on plastic (COP) method, or an ultrasonic bonding method. However, embodiments according to the present disclosure are not limited thereto. For example, the display driving circuit 200 may also be mounted on the circuit board 300 by a chip on film (COF) method.

The circuit board 300 may be attached and electrically connected to the signal pads SPD of the second sub-area SB2 using an anisotropic conductive film or a low-resistance, high-reliability material such as SAP.

The pixel drivers PXD of the display area DA and the display driving circuit 200 may receive digital video data, timing signals, and driving voltages from the circuit board 300.

The circuit board 300 may be a flexible printed circuit board, a printed circuit board, or a flexible film such as a chip on film.

The non-display area NDA includes a demultiplexer (demux) area DXA in which demux circuit units DMC (see FIG. 5) are located and a test line area TLA (see FIG. 5) in which test signal supply lines TSSPL (see FIG. 5) are located.

The demux area DXA and the test line area TLA may be located adjacent to an edge of the display area DA in the second direction DR2 which is adjacent to the sub-area SBA.

At least a portion of the test line area TLA may be located between the demux area DXA and the display area DA.

In addition, the non-display area NDA may further include a scan driving circuit area SCDA located adjacent to at least one edge of the display area DA in the first direction DR1.

The circuit layer 120 may include a scan driving circuit located in the scan driving circuit area SCDA. The scan driving circuit may supply scan signals respectively to scan lines extending in the first direction DR1 in the display area DA.

For example, the display driving circuit 200 or the circuit board 300 may supply a scan control signal to the scan driving circuit based on digital video data and timing signals.

In addition, the circuit board 300 may supply a predetermined constant voltage for generating scan signals to the scan driving circuit.

Although the scan driving circuit area SCDA is a portion of the non-display area NDA which is adjacent to both edges of the display area DA in the first direction DR1 in FIG. 4, this is only an example. That is, according to some embodiments, the scan driving circuit area SCDA may also be a portion of the non-display area NDA which is adjacent to any one side of the display area DA in the first direction DR1 or may be provided as separate areas which overlap portions of the display area DA.

The demux area DXA may be a portion of the non-display area NDA which is adjacent to the sub-area SBA. The demux circuit units DMC (see FIG. 5) are located in the demux area DXA. The demux circuit units DMC are electrically connected between the data lines DL extending in the second direction DR2 in the display area DA and the display driving circuit 200.

That is, one of the demux circuit units DMC may output data signals respectively to two or more different data lines DL based on one data driving signal DDRS (see FIG. 15) received from the display driving circuit 200.

That is, one demux circuit unit DMC may include an input terminal DXIP (see FIG. 15) which is electrically connected to the display driving circuit 200 and to which one data driving signal DDRS is input, two or more output terminals DXOP (see FIG. 15) which are electrically connected to two or more data lines DL (see FIG. 15), respectively, and two or more demux transistors DXTR (see FIG. 15) which are electrically connected between the two or more output terminals DXOP and the input terminal DXIP, respectively. The demux circuit unit DMC may time-demultiplex the data driving signal DDRS by time-dividing a turn-on period of the demux transistors DXTR and may output two or more data signals.

The demux area DXA may include a demux middle area XMA in the middle in the first direction DR1, a first demux side area XSA1 adjacent to an edge of the substrate 110 in the first direction DR1, and a second demux side area XSA2 located between the demux middle area XMA and the first demux side area XSA1 in the first direction DR1. Here, the first demux side area XSA1 may include a portion bent along a corner of the edge of the substrate 110.

The demux area DXA may include two second demux side areas XSA2 and two first demux side areas XSA1 located on both sides of the demux middle area XMA in the first direction DR1.

The display area DA may include a demux adjacent area DAA adjacent to the demux area DXA and a general area GA other than the demux adjacent area DAA. Here, input detour lines DETL (see FIG. 5) may be located in the demux adjacent area DAA.

The demux adjacent area DAA may include a display middle area DMDA adjacent to the demux middle area XMA in the second direction DR2, a first display side area DSDA1 adjacent to the first demux side area XSA1 in the second direction DR2, and a second display side area DSDA2 adjacent to the second demux side area XSA2 in the second direction DR2.

The display middle area DMDA is a middle portion of the demux adjacent area DAA.

The first display side area DSDA1 and the second display side area DSDA2 are portions between the display middle area DMDA and the non-display area NDA.

The first display side area DSDA1 is adjacent to the non-display area NDA, and the second display side area DSDA2 is adjacent to the display middle area DMDA.

Figure 5:
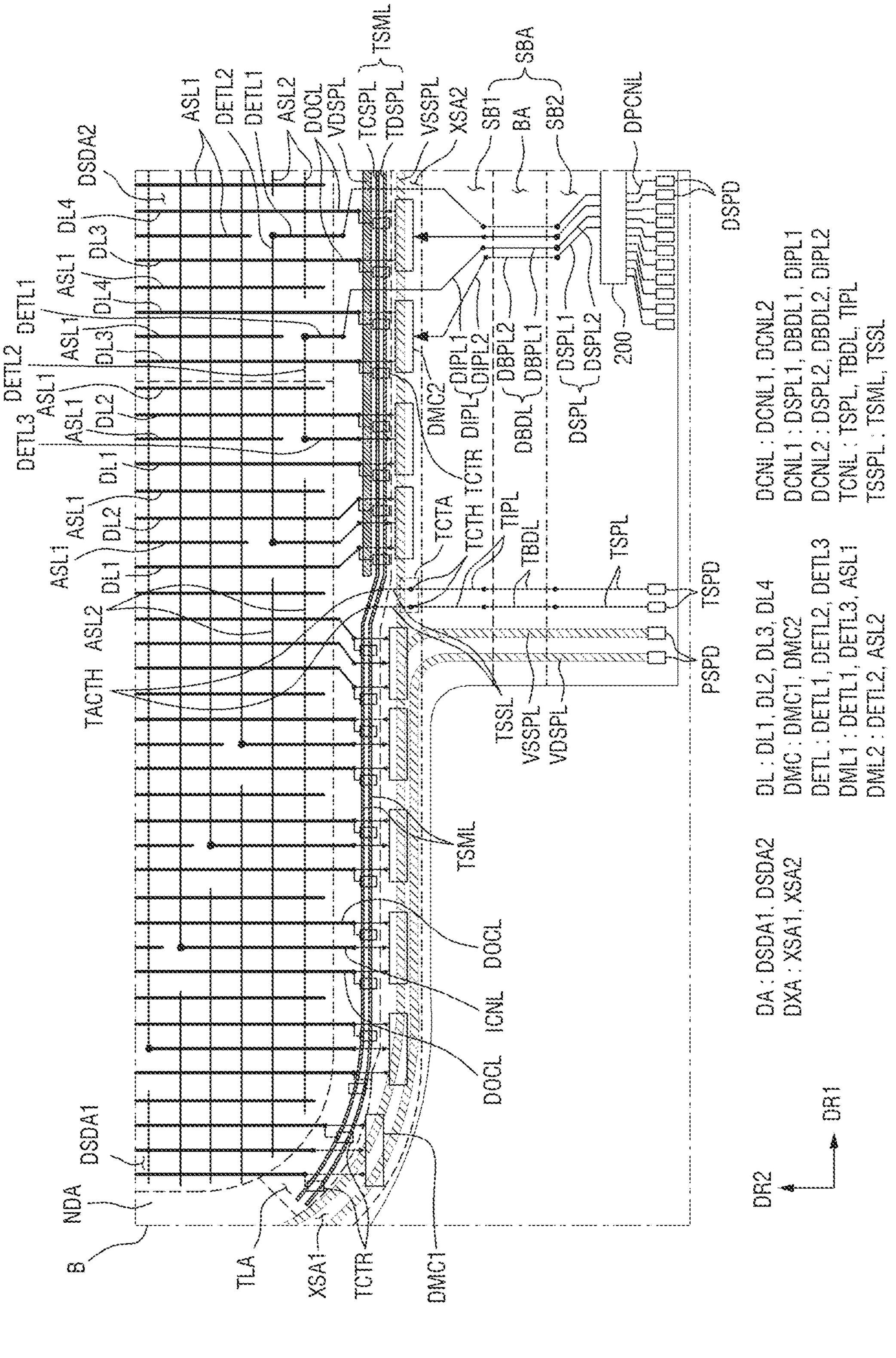
FIG. 5 is a layout view of an example of portion B of FIG. 4 according to some embodiments.

FIG. 5 is a layout view of an example of portion B of FIG. 4.

As illustrated in FIGS. 1 through 4, the display device 10 according to some embodiments includes the substrate 110 including the main area MA, which includes the display area DA in which the emission areas EA are arranged and the non-display area NDA located around the display area DA, and the sub-area SBA protruding from a side of the main area MA, the circuit layer 120 located on the substrate 110, the light emitting element layer 130 located on the circuit layer 120, and the display driving circuit 200 located on the sub-area SBA of the substrate 110 and supplying data driving signals DDRS corresponding to the data lines DL of the circuit layer 120.

The circuit layer 120 of the display device 10 according to some embodiments includes the pixel drivers PXD corresponding to the emission areas EA, respectively, and the data lines DL transmitting data signals to the pixel drivers PXD.

In addition, the light emitting element layer 130 of the display device 10 according to some embodiments includes the light emitting elements LEL corresponding to the emission areas EA, respectively.

Referring to FIG. 5, the circuit layer 120 of the display device 10 according to some embodiments further includes the demux circuit units DMC located side by side in the demux area DXA of the non-display area NDA and electrically connected between the data lines DL and the display driving circuit 200, the test signal supply lines TSSPL located in the non-display area NDA and respectively transmitting test signals for testing the lighting state of the light emitting elements LEL, and test pad connection lines TCNL respectively electrically connected to test signal pads TSPD located in the sub-area SBA and extending to the non-display area NDA.

The test signal supply lines TSSPL are electrically connected to the test pad connection lines TCNL through test line connection contact holes TCTH, respectively.

The test line connection contact holes TCTH are located in a test connection area TCTA which is a part of the demux area DXA adjacent to the sub-area SBA.

According to some embodiments, the test line connection contact holes TCTH for electrical connection between the test signal supply lines TSSPL and the test pad connection lines TCNL are located not in the test line area TLA, but in the test connection area TCTA which is a part of the demux area DXA adjacent to the sub-area SBA. Therefore, the test pad connection lines TCNL may not extend toward edges of the substrate 110 to avoid the demux circuit units DMC located in the demux area DXA. Accordingly, a width allocated to the arrangement of the test pad connection lines TCNL in the non-display area NDA may be reduced, which, in turn, reduces a width of the non-display area NDA.

The demux circuit units DMC may be arranged in the first direction DR1 in the demux area DXA. Therefore, the test connection area TCTA can be provided relatively easily as a part of the demux area DXA by adjusting a distance between two or more of the demux circuit units DMC adjacent to the sub-area SBA to be smaller than a distance between the other demux circuit units DMC.

Each of the demux circuit units DMC may include an input terminal DXIP (see FIG. 15) to which a data driving signal DDRS of the display driving circuit 200 is input, two or more output terminals DXOP (see FIG. 15) from which two or more different data signals corresponding to the data driving signal DDRS are output, respectively, and two or more demux transistors DXTR (see FIG. 15) electrically connected between the two or more output terminals DXOP and the input terminal DXIP, respectively.

The circuit layer 120 of the display device 10 according to some embodiments may further include output connection lines DOCL electrically connecting the output terminals DXOP of the demux circuit units DMC and the data lines DL, respectively.

The output connection lines DOCL may be located in the demux area DXA and the test line area TLA and may extend in the second direction DR2.

The demux circuit units DMC of the demux area DXA may include first demux circuit units DMC1 located in the first demux side area XSA1 and second demux circuit units DMC2 located in the second demux side area XSA2.

The circuit layer 120 of the display device 10 according to some embodiments may further include circuit output lines DCNL electrically connected to the display driving circuit 200 and extending to the demux area DXA.

The display driving circuit 200 may be located in the second sub-area SB2.

Accordingly, each of the circuit output lines DCNL may include a data supply line DSPL located in the second sub-area SB2 and electrically connected to an output terminal of the display driving circuit 200, a data bending line DBDL located in the bending area BA and electrically connected to the data supply line DSPL, and a data input line DIPL extending from the first sub-area SB1 to the non-display area NDA and electrically connected to the data bending line DBDL.

The circuit output lines DCNL may include first circuit output lines DCNL1 electrically connected to the first demux circuit units DMC1 of the first demux side area XSA1 and second circuit output lines DCNL2 electrically connected to the second demux circuit units DMC2 of the second demux side area XSA2.

The second circuit output lines DCNL2 may be directly electrically connected to the input terminals DXIP of the second demux circuit units DMC2.

On the other hand, the first circuit output lines DCNL1 may not be directly connected to the input terminals DXIP of the first demux circuit units DMC1 but may be electrically connected to the input terminals DXIP of the first demux circuit units DMC1 through the input detour lines DETL and input connection lines ICNL.

That is, the circuit layer 120 of the display device 10 according to some embodiments may further include the input connection lines ICNL located in the non-display area NDA and electrically connected to the input terminals DXIP (see FIG. 15) of the first demux circuit units DMC1 and the input detour lines DETL located in the display area DA and electrically connecting the first circuit output lines DCNL1 and the input connection lines ICNL.

The data lines DL located in the display area DA may extend in the second direction DR2.

The input detour lines DETL may include first detour lines DETL1 electrically connected to the first circuit output lines DCNL1 and extending in the second direction DR2, second detour lines DETL2 electrically connected to the first detour lines DETL1 and extending in the first direction DR1, and third detour lines DETL3 electrically connected to the second detour lines DETL2 and extending in the second direction DR2 toward the first demux side area XSA1 of the demux area DXA. That is, the third detour lines DETL3 may electrically connect the second detour lines DETL2 and the input connection lines ICNL.

The first detour lines DETL1 may be located in the second display side area DSDA2 adjacent to the second demux side area XSA2.

The third detour line DETL3 may be located in the first display side area DSDA1 adjacent to the first demux side area XSA1.

Because the first demux circuit units DMC1 located in the first demux side area XSA1 adjacent to a curved corner of the substrate 110 are not directly electrically connected to the first circuit output lines DCNL1 as described above, the first circuit output lines DCNL1 do not need to extend to the first demux side area XSA1.

Accordingly, like the second circuit output lines DCNL2, the first circuit output lines DCNL1 may be located in the sub-area SBA and the second demux side area XSA2 relatively adjacent to the demux middle area XMA. That is, in the demux area DXA, the first circuit output lines DCNL1 may be located adjacent to the second circuit output lines DCNL2.

Therefore, because the first circuit output lines DCNL1 are not located in the first demux side area XSA1, a width of the first demux side area XSA1 including a portion bent along a corner of the substrate 110 may be reduced, which, in turn, reduces the width of the non-display area NDA.

Each of the first circuit output lines DCNL1 may include a first data supply line DSPL1 located in the second sub-area SB2, a first data bending line DBDL1 located in the bending area BA, and a first data input line DIPL1 extending from the first sub-area SB1 to the demux area DXA of the non-display area NDA.

The first data supply line DSPL1 of the second sub-area SB2 may electrically connect one output terminal of the display driving circuit 200 and the first data bending line DBDL1.

The first data bending line DBDL1 of the bending area BA may electrically connect the first data supply line DSPL1 and the first data input line DIPL1.

The first data input line DIPL1 extending from the first sub-area SB1 to the second demux side area XSA2 of the demux area DXA may electrically connect the first data bending line DBDL1 and an input detour line DETL.

The input detour lines DETL may be located in the demux adjacent area DAA of the display area DA and may electrically connect the first data input lines DIPL1 and the input connection lines ICNL.

The input connection lines ICNL may electrically connect the input detour lines DETL and the input terminals DXIP of the first demux circuit units DMC1.

Therefore, the first demux circuit units DMC1 may be electrically connected to the display driving circuit 200 through the input connection lines ICNL of the first demux side area XSA1, the input detour lines DETL of the display area DA, the first data input lines DIPL1 extending from the first sub-area SB1 to the second demux side area XSA2, the first data bending lines DBDL1 of the bending area BA, and the first data supply lines DSPL1 of the second sub-area SB2.

Each of the second circuit output lines DCNL2 may include a second data supply line DSPL2 located in the second sub-area SB2, a second data bending line DBDL2 located in the bending area BA, and a second data input line DIPL2 extending from the first sub-area SB1 to the demux area DXA of the non-display area NDA.

The second data supply line DSPL2 of the second sub-area SB2 may electrically connect another output terminal of the display driving circuit 200 and the second data bending line DBDL2.

The second data bending line DBDL2 of the bending area BA may electrically connect the second data supply line DSPL2 and the second data input line DIPL2.

The second data input line DIPL2 extending from the first sub-area SB1 to the second demux side area XSA2 of the demux area DXA may electrically connect the second data bending line DBDL2 and the input terminal DXIP of a second demux circuit unit DMC2.

Because the first circuit output lines DCNL1 are not directly connected to the first demux circuit units DMC1, the first circuit output lines DCNL1 and the second circuit output lines DCNL2 may be located adjacent to each other in the demux area DXA. That is, the first data input lines DIPL1 of the first circuit output lines DCNL1 and the second data input lines DIPL2 of the second circuit output lines DCNL2 may be located adjacent to each other in the second demux side area XSA2.

According to some embodiments, the circuit layer 120 may further include data pad connection lines DPCNL located in the second sub-area SB2 and electrically connecting data pads DSPD and the display driving circuit 200.

According to some embodiments, the circuit layer 120 may further include a first power supply line VDSPL and a second power supply line VSSPL located in the non-display area NDA and respectively transmitting a first power voltage and a second power voltage for driving the light emitting elements LEL of the light emitting element layer 130.

The first power supply line VDSPL and the second power supply line VSSPL may extend from the non-display area NDA to the second sub-area SB2 and may be respectively electrically connected to power pads PSPD located in the second sub-area SB2.

The circuit layer 120 of the display device 10 according to some embodiments further includes the test signal supply lines TSSPL and the test pad connection lines TCNL.

Each of the test signal supply lines TSSPL may include a test signal main line TSML located in the test line area TLA and extending in the first direction DR1 and a test signal sub-line TSSL electrically connecting the test signal main line TSML and a test pad connection line TCNL and extending in the second direction DR2.

That is, one of the test signal supply lines TSSPL may include the test signal main line TSML located in the test line area TLA of the non-display area NDA between the display area DA and the demux area DXA and extending in the first direction DR1 and the test signal sub-line TSSL electrically connecting one of the test pad connection lines TCNL and the test signal main line TSML and extending in the second direction DR2.

The test signal sub-line TSSL of one test signal supply line TSSPL may be electrically connected to one test pad connection line TCNL through one of the test line connection contact holes TCTH.

In addition, the test signal sub-line TSSL of one test signal supply line TSSPL may be electrically connected to the test signal main line TSML through a test line auxiliary contact hole TACTH located in the test line area TLA.

The test signal supply lines TSSPL may transmit a test data signal for performing a lighting test on all of the light emitting elements LEL of the light emitting element layer 130 at once and a test control signal for controlling whether to transmit the test data signal.

That is, the test signal main lines TSML may include a test data supply line TDSPL transmitting a test data signal TDS (see FIG. 15) for a lighting test and a test control supply line TCSPL transmitting a test control signal TCS (see FIG. 15) for controlling whether to transmit the test data signal TDS.

The test signal supply lines TSSPL may be electrically connected to the test signal pads TSPD through the test pad connection lines TCNL, respectively.

The test signal pads TSPD may be located in the second sub-area SB2.

Accordingly, each of the test pad connection lines TCNL may include a test supply line TSPL located in the second sub-area SB2 and electrically connected to a test signal pad TSPD, a test bending line TBDL located in the bending area BA and electrically connected to the test supply line TSPL, and a test input line TIPL extending from the first sub-area SB1 to the non-display area NDA and electrically connected to the test bending line TBDL.

As described above, according to some embodiments, each of the test signal supply lines TSSPL includes not only the test signal main line TSML located in the test line area TLA but also the test signal sub-line TSSL electrically connecting the test signal main line TSML and a test pad connection line TCNL. Accordingly, the test line connection contact holes TCTH for electrical connection between the test signal supply lines TSSPL and the test pad connection lines TCNL may be located not in the test line area TLA but in a part of the demux area DXA.

Furthermore, because the first demux circuit units DMC1 of the first demux side area XSA1 are not directly connected to the first circuit output lines DCNL1 but are electrically connected to the first circuit output lines DCNL1 through the input detour lines DETL and the input connection lines ICNL, the first circuit output lines DCNL1 may not be located in the first demux side area XSA1.

Accordingly, because the first circuit output lines DCNL1 are not located in the first demux side area XSA1, the test connection area TCTA for electrical connection between the test signal supply lines TSSPL and the test pad connection lines TCNL can be provided relatively easily. That is, because the first circuit output lines DCNL1 are not located in the first demux side area XSA1, the test signal supply lines TSSPL and the test pad connection lines TCNL can be placed more easily.

That is, the test connection area TCTA may be located between two first demux circuit units DMC1.

In other words, the test connection area TCTA in which the test line connection contact holes TCTH for electrical connection between the test signal supply lines TSSPL and the test pad connection lines TCNL are located can be provided relatively easily as a part of the first demux side area XSA1 in which the first circuit output lines DCNL1 are not located.

The circuit layer 120 of the display device 10 according to some embodiments may further include test control transistors TCTR located in the test line area TLA and electrically connected to the data lines DL and the test signal supply lines TSSPL.

The test control transistors TCTR may be electrically connected between the data lines DL and the test data supply line TDSPL and may be turned on/off based on the test control signal TCS of the test control supply line TCSPL.

Accordingly, when the test control transistors TCTR are turned on by the test control signal TCS of the test control supply line TCSPL in a state where the test data signal TDS is transmitted to the test data supply line TDSPL, the test data signal TDS may be transmitted to the data lines DL. At this time, driving signals may be respectively supplied to the light emitting elements LEL of the light emitting element layer 130 through the data lines DL and the pixel drivers PXD to test the lighting state of the light emitting elements LEL.

In addition, in a state where the test control transistors TCTR are turned off by the test control signal TCS of the test control supply line TCSPL, data signals by the demux circuit units DMC may be transmitted to the data lines DL, respectively.

The data lines DL of the display area DA may include first and second data lines DL1 and DL2 respectively electrically connected to the output terminals DXOP of the first demux circuit units DMC1 of the first demux side area XSA1 and located in the first display side area DSDA1 and third and fourth data lines DL3 and DL4 respectively electrically connected to the output terminals DXOP of the second demux circuit units DMC2 of the second demux side area XSA2 and located in the second display side area DSDA2.

As mentioned above, the circuit layer 120 according to some embodiments includes the input detour lines DETL located in the display area DA. However, because the input detour lines DETL are located only in the first display side area DSDA1 and the second display side area DSDA2 of the display area DA, display quality may deteriorate if the presence or absence of the input detour lines DETL is recognized.

To prevent or reduce this, the circuit layer 120 of the display device 10 according to some embodiments may further include first dummy lines DML1 respectively neighboring the data lines DL and extending in the second direction DR2 and second dummy lines DML2 extending in the first direction DR1.

The first dummy lines DML1 may include the first and third detour lines DETL1 and DETL3 extending in the second direction DR2 among the input detour lines DETL and first auxiliary lines ASL1 other than the first and third detour lines DETL1 and DETL3.

The second dummy lines DML2 may include the second detour lines DETL2 extending in the first direction DR1 among the input detour lines DETL and second auxiliary lines ASL2 other than the second detour lines DETL2.

In addition, because the first data input lines DIPL1 of the first circuit output lines DCNL1 are located in the second demux side area XSA2, the first detour lines DETL1 of the input detour lines DETL may be located in the second display side area DSDA2.

Accordingly, the first detour lines DETL1 may be located between the third data lines DL3 and the fourth data lines DL4.

In addition, because the first demux circuit units DMC1 are located in the first demux side area XSA1, the third detour lines DETL3 of the input detour lines DETL may be located in the first display side area DSDA1 adjacent to the first demux side area XSA1.

Accordingly, the third detour lines DETL3 may be located between the first data lines DL1 and the second data lines DL2.

Because the first detour lines DETL1 and the third detour lines DETL3 extend until they are connected to the second detour lines DETL2, some of the first auxiliary lines ASL1 may be located side by side with one side of each first detour line DETL1 and one side of each third detour line DETL3 in the second direction DR2, respectively.

In addition, because the second detour lines DETL2 extend until they are connected to the first detour lines DETL1 and the third detour lines DETL3, some of the second auxiliary lines ASL2 may be located side by side with both sides of each second detour line DETL2 in the first direction DR1.

The first auxiliary lines ASL1 and the second auxiliary lines ASL2 may be electrically connected to each other and may be electrically connected to the second power supply line VSSPL.

In this case, the first auxiliary lines ASL1 and the second auxiliary lines ASL2 may reduce an RC delay of the second power supply.

In addition, according to some embodiments, a portion of the second power supply line VSSPL may be located in the demux area DXA. In this case, even if the demux area DXA is further included, the width of the non-display area NDA may be increased by a smaller difference than the width of the demux area DXA.

Figure 6:
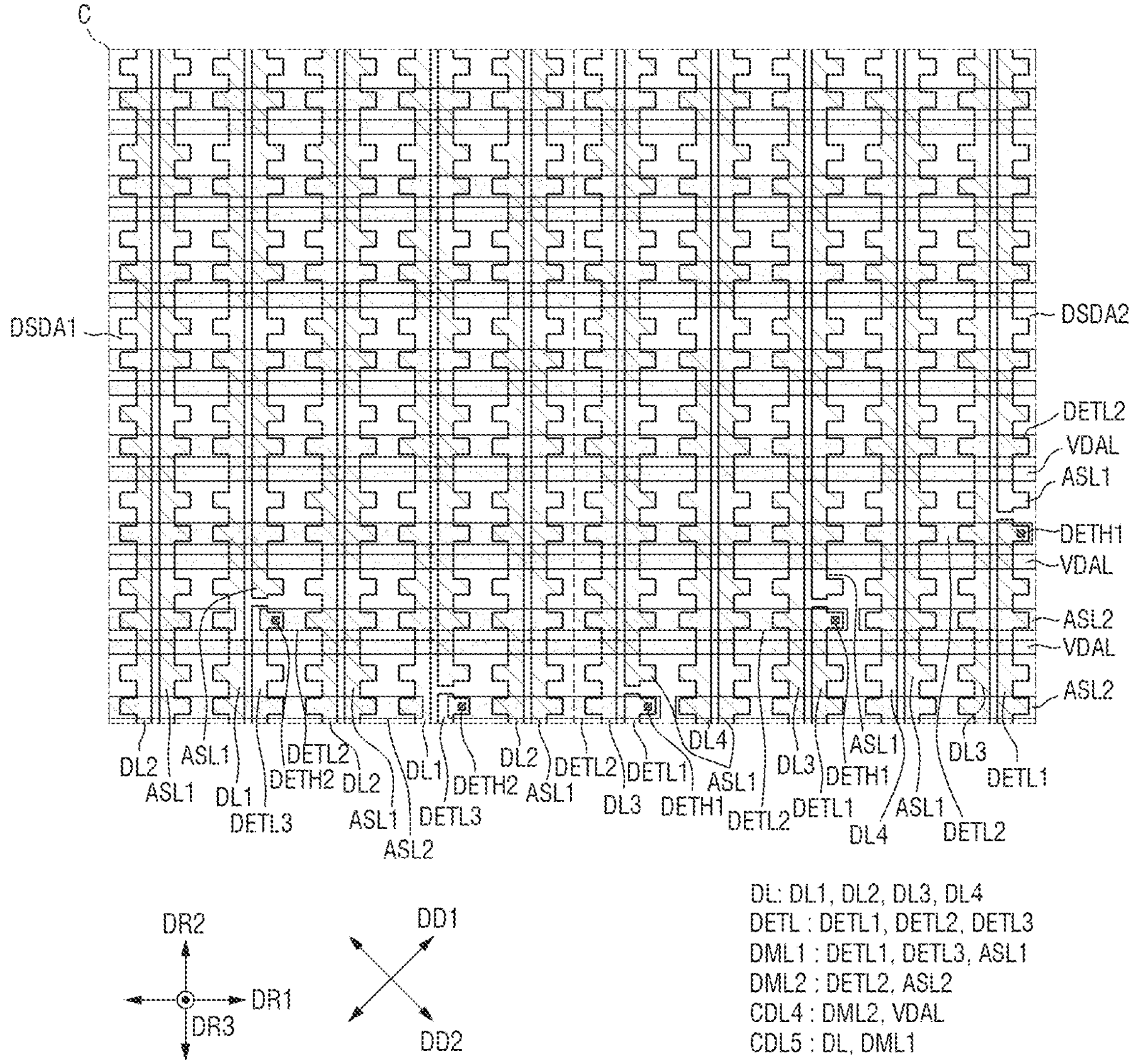
FIG. 6 is a plan view of an example of data lines, first dummy lines, second dummy lines, and first power auxiliary lines located in portion C of FIG. 4 according to some embodiments.
Figure 7:
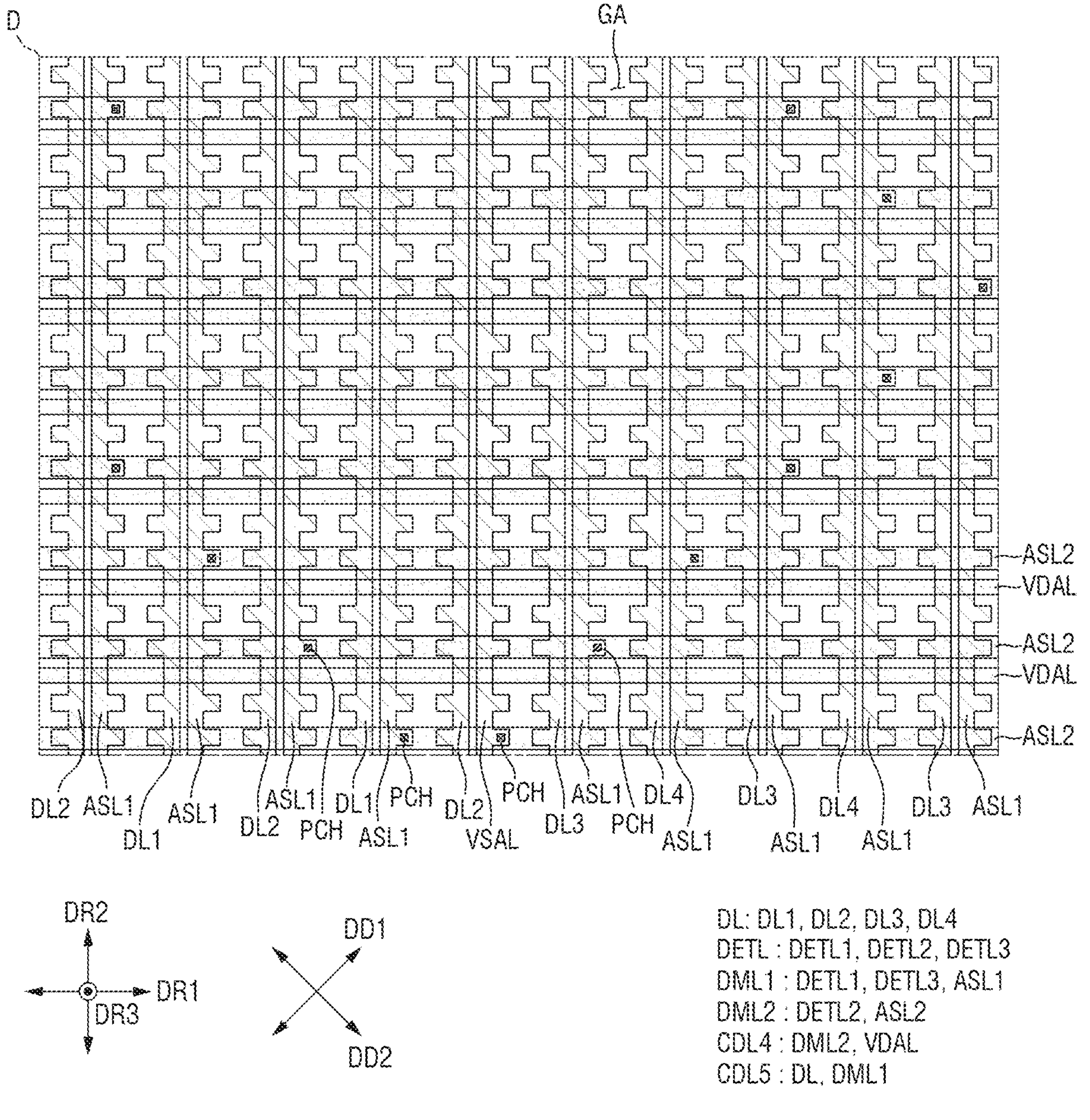
FIG. 7 is a plan view of an example of the data lines, the first dummy lines, the second dummy lines, and the first power auxiliary lines located in portion D of FIG. 4 according to some embodiments.

FIG. 6 is a plan view of an example of the data lines DL, the first dummy lines DML1, the second dummy lines DML2, and first power auxiliary lines VDAL located in portion C of FIG. 4. FIG. 7 is a plan view of an example of the data lines DL, the first dummy lines DML1, the second dummy lines DML2, and the first power auxiliary lines VDAL located in portion D of FIG. 4.

FIG. 6 illustrates a portion of each of the first display side area DSDA1 and the second display side area DSDA2 as well as a boundary between the first display side area DSDA1 and the second display side area DSDA2 of FIG. 4.

FIG. 7 illustrates a portion of the general area GA located side by side with a portion of each of the first display side area DSDA1 and the second display side area DSDA2 of FIG. 6 in the second direction DR2.

Referring to FIGS. 6 and 7, the first and second data lines DL1 and DL2 respectively electrically connected to the output terminals DXOP of each first demux circuit unit DMC1 extend from the first display side area DSDA1 to the general area GA in the second direction DR2.

The first and second data lines DL1 and DL2 may neighbor the third detour lines DETL3 of the input detour lines DETL or the first auxiliary lines ASL1.

That is, a portion of each first data line DL1 may neighbor a third detour line DETL3 on one side thereof (a right side of FIGS. 6 and 7) in the first direction DR1 while the other portion of each first data line DL1 neighbors a first auxiliary line ASL1, and each second data line DL2 may neighbor a first auxiliary line ASL1 on one side thereof in the first direction DR1.

In addition, the third and fourth data lines DL3 and DL4 respectively electrically connected to the output terminals DXOP of each second demux circuit unit DMC2 extend from the second display side area DSDA2 to the general area GA in the second direction DR2.

The third and fourth data lines DL3 and DL4 may neighbor the first detour lines DETL1 of the input detour lines DETL or the first auxiliary lines ASL1.

That is, a portion of each third data line DL3 may neighbor a first detour line DETL1 on one side thereof (the right side of FIGS. 6 and 7) in the first direction DR1 while the other portion of each third data line DL3 neighbors a first auxiliary line ASL1, and each fourth data line DL4 may neighbor a first auxiliary line ASL1 on one side thereof in the first direction DR1.

Because the second detour lines DETL2 of the input detour lines DETL are designed to jump the data lines DL and the first dummy lines DML1, they are made of a different conductive layer from the data lines DL and the first dummy lines DML1.

As will be described later with reference to FIGS. 12 through 14, the circuit layer 120 may include a semiconductor layer SEL on the substrate 110, a first conductive layer CDL1 on a first gate insulating layer 122 covering the semiconductor layer SEL, a second conductive layer CDL2 on a second gate insulating layer 123 covering the first conductive layer CDL1, a third conductive layer CDL3 on an interlayer insulating layer 124 covering the second conductive layer CDL2, a fourth conductive layer CDL4 on a first planarization layer 125 covering the third conductive layer CDL3, a fifth conductive layer CDL5 on a second planarization layer 126 covering the fourth conductive layer CDL4, and a third planarization layer 127 covering the fifth conductive layer CDL5.

The data lines DL and the first dummy lines DML1 may be made of the fifth conductive layer CDL5. In addition, the second dummy lines DML2 may be made of the fourth conductive layer CDL4.

An end of each of the second detour lines DETL2 of the input detour lines DETL may be electrically connected to a first detour line DETL1 through a first bypass connection hole DETH1 located in the second display side area DSDA2.

In addition, the other end of each of the second detour lines DETL2 may be electrically connected to a third detour line DETL3 through a second bypass connection hole DETH2 located in the first display side area DSDA1.

In the second display side area DSDA2, the first bypass connection holes DETH1 may be arranged side by side in a first diagonal direction DD1.

In the first display side area DSDA1, the second bypass connection holes DETH2 may be arranged side by side in a second diagonal direction DD2.

In this case, whether the first bypass connection holes DETH1 and the second bypass connection holes DETH2 are normally arranged can be inferred relatively easily from the arrangement form of the first bypass connection holes DETH1 and the arrangement form of the second bypass connection holes DETH2.

The circuit layer 120 of the display device 10 according to some embodiments may further include the first power auxiliary lines VDAL located in the display area DA, extending in the first direction DR1, made of the fourth conductive layer CDL4, and electrically connected to the first power supply line VDSPL.

The first power auxiliary lines VDAL are designed to reduce the RC delay when the first power is supplied.

The first power auxiliary lines VDAL may be alternate with the second dummy lines DML2 in the second direction DR2.

That is, the second dummy lines DML2 may neighbor the first power auxiliary lines VDAL, respectively.

As illustrated in FIG. 7, the first auxiliary lines ASL1 may be electrically connected to the second auxiliary lines ASL2 through power connection holes PCH located in a portion of the general area GA.

The power connection holes PCH may be arranged side by side with each other in the first diagonal direction DD1 or the second diagonal direction DD2.

In this case, whether the power connection holes PCH are normally arranged can be detected relatively easily through the arrangement form of the power connection holes PCH.

Figure 8:
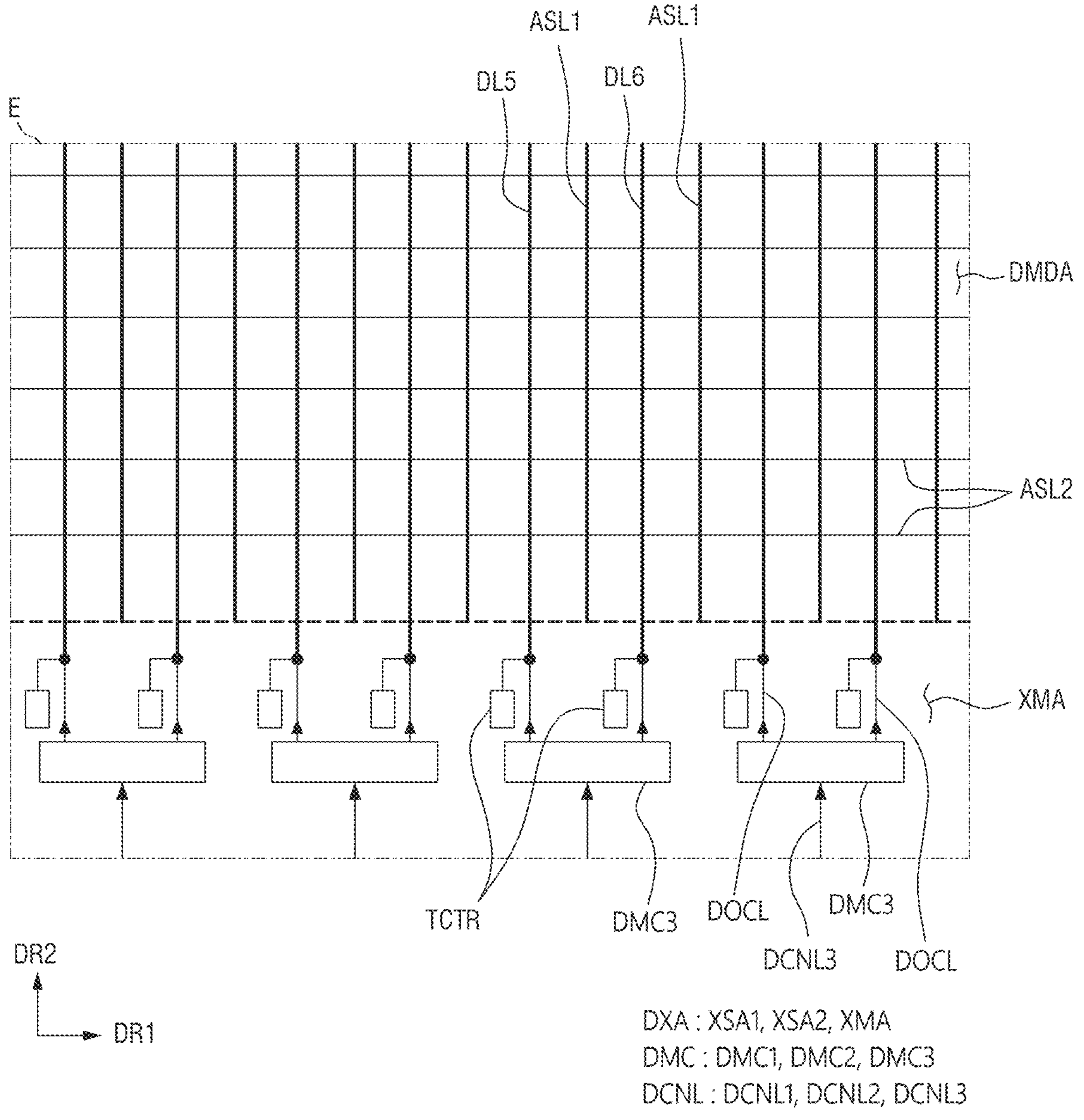
FIG. 8 is a layout view of an example of portion E of FIG. 4 according to some embodiments.
Figure 9:
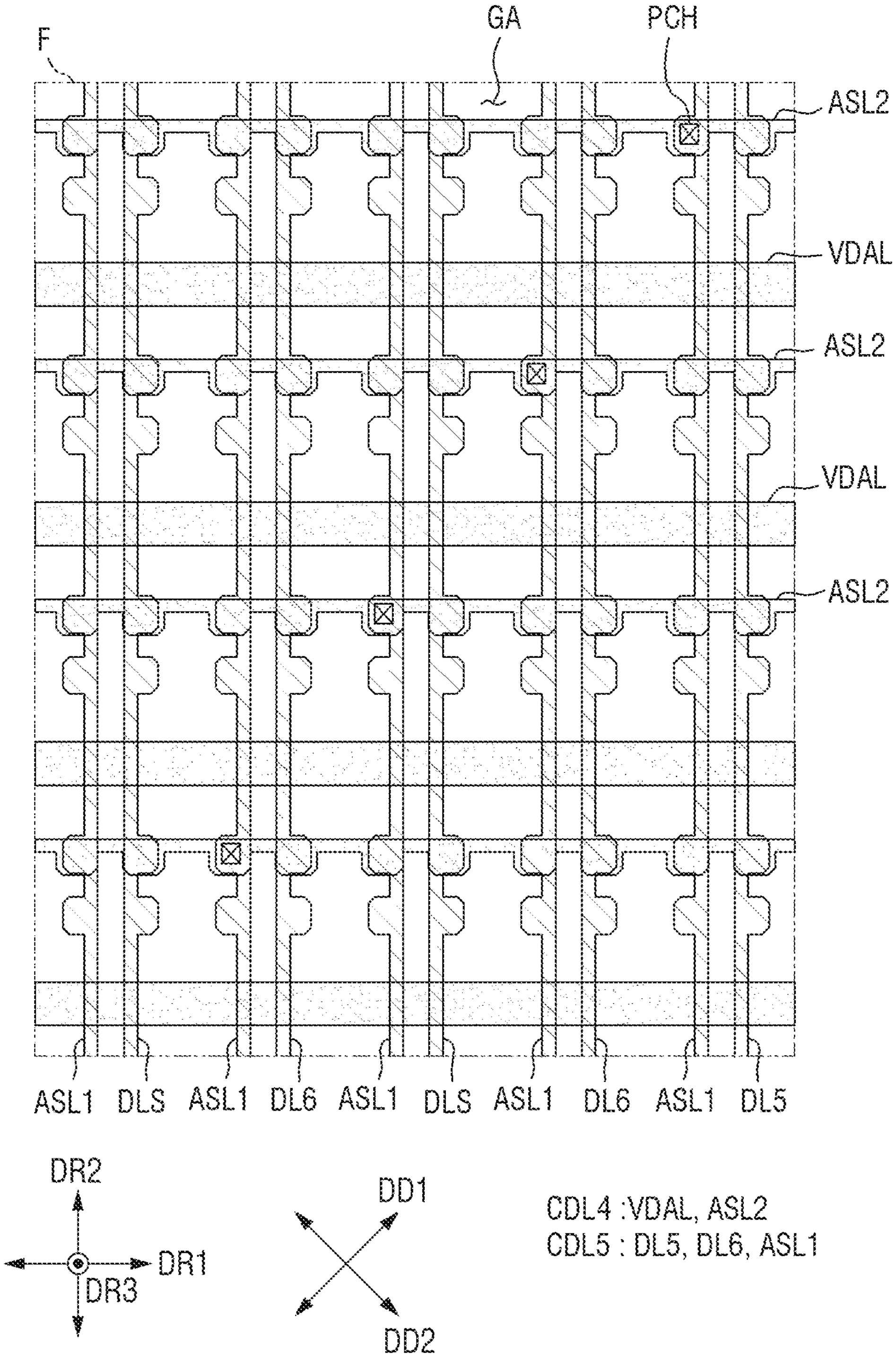
FIG. 9 is a plan view of an example of the data lines, the first dummy lines, the second dummy lines, and the first power auxiliary lines located in portion F of FIG. 4 according to some embodiments.

FIG. 8 is a layout view of an example of portion E of FIG. 4. FIG. 9 is a plan view of an example of the data lines DL, the first dummy lines DML1, the second dummy lines DML2, and the first power auxiliary lines VDAL located in portion F of FIG. 4.

As mentioned above, the demux area DXA may include the demux middle area XMA located in the middle in the first direction DR1, the first demux side area XSA1 adjacent to an edge of the substrate 110, and the second demux side area XSA2 between the demux middle area XMA and the first demux side area XSA1.

In addition, the demux adjacent area DAA of the display area DA may include the display middle area DMDA adjacent to the demux middle area XMA, the first display side area DSDA1 adjacent to the first demux side area XSA1, and the second display side area DSDA2 adjacent to the second demux side area XSA2.

Referring to FIG. 8, the demux circuit units DMC may further include third demux circuit units DMC3 located in the demux middle area XMA.

The circuit output lines DCNL electrically connected to the display driving circuit 200 may further include third circuit output lines DCNL3 electrically connected to the third demux circuit units DMC3.

The third circuit output lines DCNL3 may be directly electrically connected to the input terminals DXIP of the third demux circuit units DMC3.

In addition, the data lines DL may further include fifth and sixth data lines DL5 and DL6 respectively electrically connected to the output terminals DXOP of each third demux circuit unit DMC3 and located in the display middle area DMDA.

The fifth and sixth data lines DL5 and DL6 may be electrically connected to the output terminals DXOP of each third demux circuit unit DMC3 through the output connection lines DOCL, respectively.

Referring to FIG. 9, because the input detour lines DETL are not located in the display middle area DMDA, the fifth data lines DL5 and the sixth data lines DL6 may neighbor the first auxiliary lines ASL1, respectively.

In the display middle area DMDA, the first power auxiliary lines VDAL may neighbor the second auxiliary lines ASL2, respectively.

The power connection holes PCH for electrical connection between the first auxiliary lines ASL1 and the second auxiliary lines ASL2 may be further located in the display middle area DMDA.

In the display middle area DMDA, the power connection holes PCH may be arranged side by side with each other in the first diagonal direction DD1 or the second diagonal direction DD2.

Figure 10:
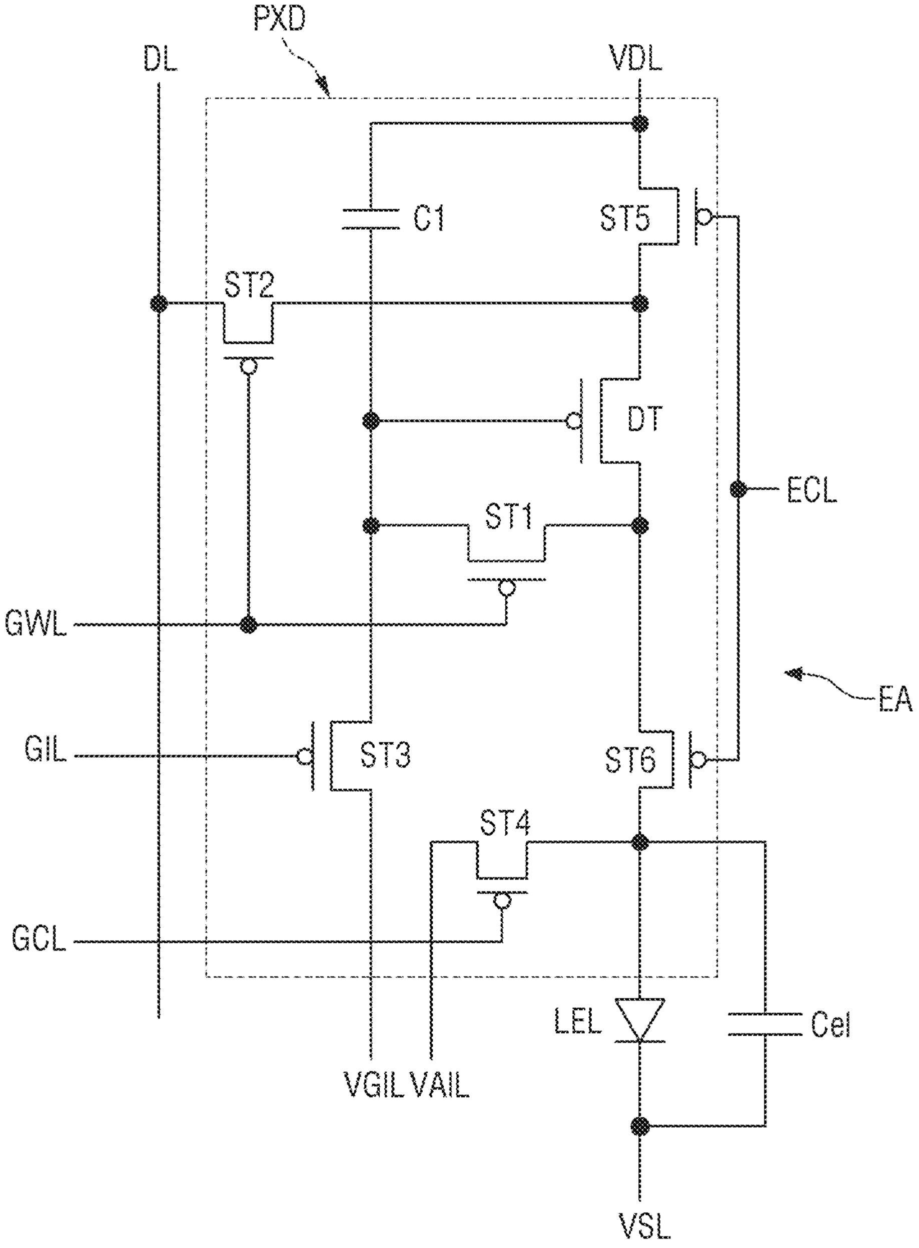
FIG. 10 is an equivalent circuit diagram of an example of one pixel driver included in one emission area of FIG. 2 according to some embodiments.
Figure 11:
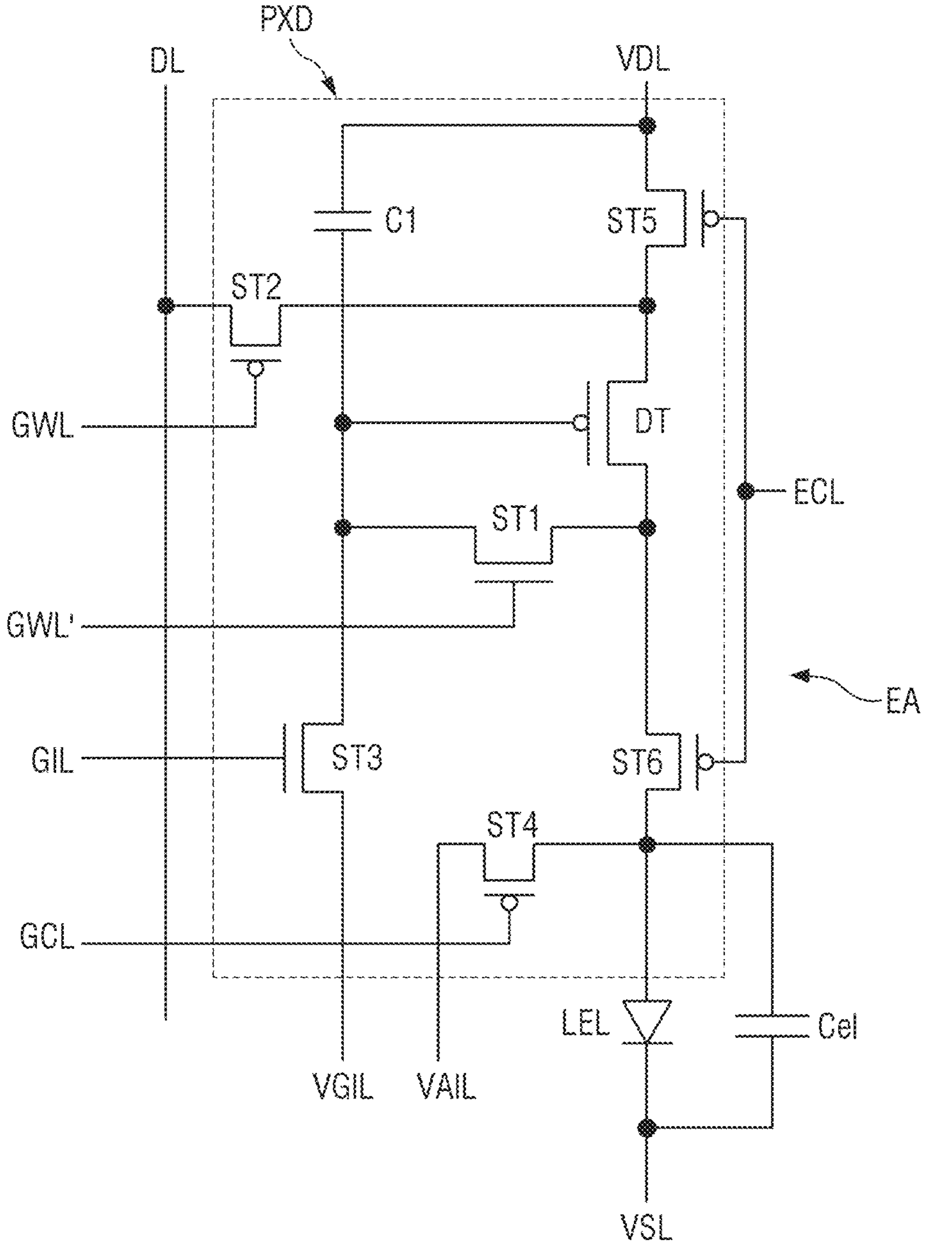
FIG. 11 is an equivalent circuit diagram of another example of one pixel driver included in one emission area of FIG. 2 according to some embodiments.

FIG. 10 is an equivalent circuit diagram of an example of one pixel driver PXD included in one emission area EA of FIG. 2. FIG. 11 is an equivalent circuit diagram of another example of one pixel driver PXD included in one emission area EA of FIG. 2.

FIG. 10 is an equivalent circuit diagram of an example of a pixel driver PXD of FIG. 5. FIG. 11 is an equivalent circuit diagram of another example of the pixel driver PXD of FIG. 5.

The circuit layer 120 includes a plurality of pixel drivers PXD corresponding to a plurality of emission areas EA, respectively. The pixel drivers PXD respectively supply driving currents to a plurality of light emitting elements LEL provided in the light emitting element layer 130.

Each of the pixel drivers PXD may include a driving transistor DT, at least one switch element, and at least one capacitor.

Referring to FIG. 10, any one of the pixel drivers PXD included in the circuit layer 120 may include a driving transistor DT, switch elements, i.e., a first transistor ST1 (switch transistor), a second transistor ST2, a third transistor ST3, a fourth transistor ST4, a fifth transistor ST5 and a sixth transistor ST6, and a capacitor C1.

In addition, scan lines of the circuit layer 120 which are connected to the scan driving circuit of the scan driving circuit area SCDA may include a write scan line GWL connected to gate electrodes of the first and second transistors ST1 and ST2, an initialization scan line GIL connected to a gate electrode of the third transistor ST3, a control scan line GCL connected to a gate electrode of the fourth transistor ST4, and an emission control line ECL connected to gate electrodes of the fifth and sixth transistors ST5 and ST6.

The driving transistor DT is connected in series to a light emitting element LEL between a first power line VDL and a second power line VSL.

A first electrode of the driving transistor DT may be connected to the first power line VDL through the fifth transistor ST5.

In addition, the first electrode of the driving transistor DT may be connected to a data line DL through the second transistor ST2.

A second electrode of the driving transistor DT may be connected to the light emitting element LEL through the sixth transistor ST6.

The capacitor C1 is connected between the first power line VDL and a gate electrode of the driving transistor DT. That is, the gate electrode of the driving transistor DT may be connected to the first power line VDL through the capacitor C1.

Therefore, when a data signal of the data line DL is transmitted to the first electrode of the driving transistor DT, the driving transistor DT generates a drain-source current corresponding to the data signal. The drain-source current of the driving transistor DT is supplied to the light emitting element LEL as a driving current.

The light emitting element LEL emits light having a luminance corresponding to the driving current generated by the driving transistor DT.

The light emitting element LEL may include an anode AND (see FIG. 14) and a cathode CTD (see FIG. 14) facing each other and a light emitting layer EML (see FIG. 14) between the anode AND and the cathode CTD.

For example, the light emitting element LEL may be an organic light emitting diode having a light emitting layer made of an organic light emitting material. Alternatively, the light emitting element LEL may be an inorganic light emitting element having a light emitting layer made of an inorganic semiconductor. Alternatively, the light emitting element LEL may be a quantum dot light emitting element having a quantum dot light emitting layer. Alternatively, the light emitting element LEL may be a micro-light emitting diode.

A capacitor Cel connected in parallel to the light emitting element LEL is a parasitic capacitance between the anode and the cathode.

The first transistor ST1 is connected between the gate electrode of the driving transistor DT and the second electrode of the driving transistor DT.

The second transistor ST2 is connected between the first electrode of the driving transistor DT and the data line DL.

The gate electrode of each of the first transistor ST1 and the second transistor ST2 is connected to the write scan line GWL.

When a write scan signal is supplied through the write scan line GWL, the first transistor ST1 and the second transistor ST2 are turned on, and the gate electrode and the second electrode of the driving transistor DT become the same potential through the turned-on first transistor ST1. In addition, the data signal of the data line DL is supplied to the first electrode of the driving transistor DT through the turned-on second transistor ST2.

Here, when a voltage difference between the first electrode and the gate electrode of the driving transistor DT is greater than a threshold voltage, the driving transistor DT may be turned on, and thus the drain-source current may be generated between the first electrode and the second electrode of the driving transistor DT.

The third transistor ST3 is connected between the gate electrode of the driving transistor DT and a gate initialization voltage line VGIL. The gate electrode of the third transistor ST3 is connected to the initialization scan line GIL.

When an initialization scan signal is supplied through the initialization scan line GIL, the third transistor ST3 is turned on. At this time, the gate electrode of the driving transistor DT is connected to the gate initialization voltage line VGIL through the turned-on third transistor ST3. Accordingly, the potential of the gate electrode of the driving transistor DT is initialized to a first initialization voltage of the gate initialization voltage line VGIL.

The fourth transistor ST4 is connected between the anode of the light emitting element LEL and an anode initialization voltage line VAIL. The gate electrode of the fourth transistor ST4 is connected to the control scan line GCL.

When a control scan signal is supplied through the control scan line GCL, the fourth transistor ST4 is turned on. At this time, the anode of the light emitting element LEL is connected to the anode initialization voltage line VAIL through the turned-on fourth transistor ST4. Accordingly, the potential of the anode of the light emitting element LEL is initialized to a second initialization voltage of the anode initialization voltage line VAIL.

The fifth transistor ST5 is connected between the first electrode of the driving transistor DT and the first power line VDL.

The sixth transistor ST6 is connected between the second electrode of the driving transistor DT and the anode of the light emitting element LEL.

The gate electrode of each of the fifth transistor ST5 and the sixth transistor ST6 is connected to the emission control line ECL.

When an emission control signal is supplied through the emission control line ECL, the driving transistor DT and the light emitting element LEL are connected in series between the first power line VDL and the second power line VSL. Accordingly, the light emitting element LEL emits light based on a driving current generated by the driving transistor DT.

As illustrated in FIG. 10, the driving transistor DT and the switch elements ST1 through ST6 included in the pixel driver PXD may all be provided as P-type metal-oxide-semiconductor field-effect transistors (MOSFETs).

In this case, all of the scan lines GWL, GIL, GCL and ECL may supply low-level turn-on signals.

Alternatively, unlike in FIG. 10, some of the driving transistor DT and the switch elements ST1 through ST6 included in the pixel driver PXD may be provided as P-type MOSFETs, and the others may be provided as N-type MOSFETs. In this case, switch elements provided as P-type MOSFETs and switch elements provided as N-type MOSFETs may include active layers of different semiconductor materials. Therefore, a width of the pixel driver PXD may be reduced through a stacked structure, which may be advantageous in improving resolution.

For example, as illustrated in FIG. 11, a pixel driver PXD according to another example includes a driving transistor DT and one or more switch elements ST1 through ST6. However, the driving transistor DT, a second transistor ST2, a fourth transistor ST4, a fifth transistor ST5 and a sixth transistor ST6 may be provided as P-type MOSFETs having an active layer of a polysilicon semiconductor material, and a first transistor ST1 and a third transistor ST3 may be provided as N-type MOSFETs having an active layer of an oxide semiconductor material.

In this case, unlike the second transistor ST2, the first transistor ST1 may be turned on by a high-level turn-on signal. Therefore, a gate electrode of the first transistor ST1 may be connected not to a write scan line GWL, but to a separate additional write scan line GWL'.

Alternatively, according to some embodiments, not only the first transistor ST1 and the third transistor ST3 but also the fourth transistor ST4 among the switch elements ST1 through ST6 may be provided as N-type MOSFETs. In this case, a control scan line GCL may transmit a high-level turn-on signal.

Figure 12:
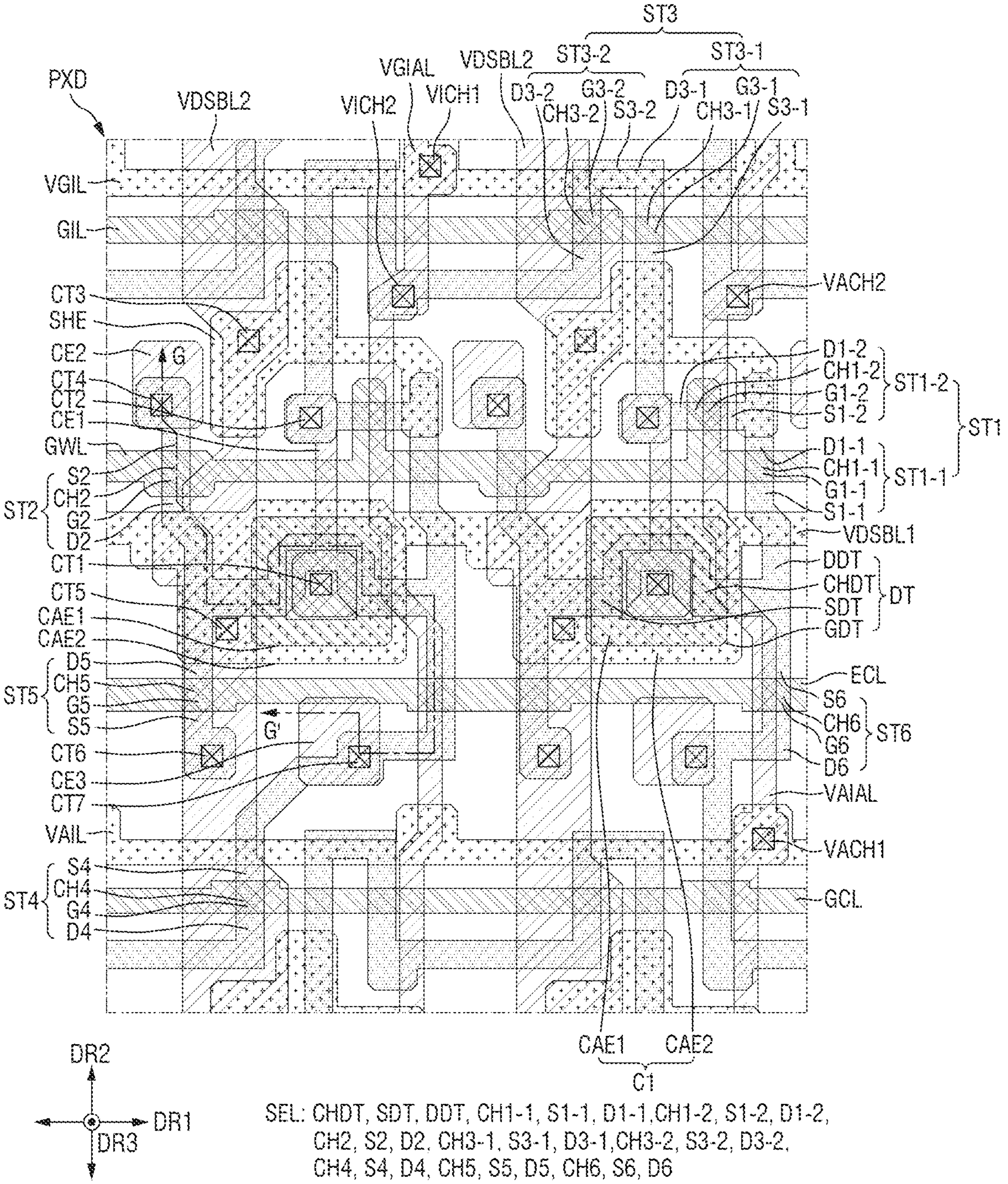
FIG. 12 is a plan view of an example of a semiconductor layer, a first conductive layer, a second conductive layer, and a third conductive layer of two pixel drivers respectively included in two adjacent emission areas of FIG. 2 according to some embodiments.

FIG. 12 is a plan view of an example of the semiconductor layer SEL, the first conductive layer CDL1, the second conductive layer CDL2, and the third conductive layer CDL3 of two pixel drivers PXD respectively included in two adjacent emission areas EA of FIG. 2. FIG. 13 is a plan view of an example of the semiconductor layer SEL, the first conductive layer CDL1, the second conductive layer CDL2, the third conductive layer CDL3, the fourth conductive layer CDL4, and the fifth conductive layer CDL5 of two pixel drivers PXD respectively included in two adjacent emission areas EA of FIG. 2. FIG. 14 is a cross-sectional view of an example of a plane cut along line G-G' of FIG. 13.

Figure 13:
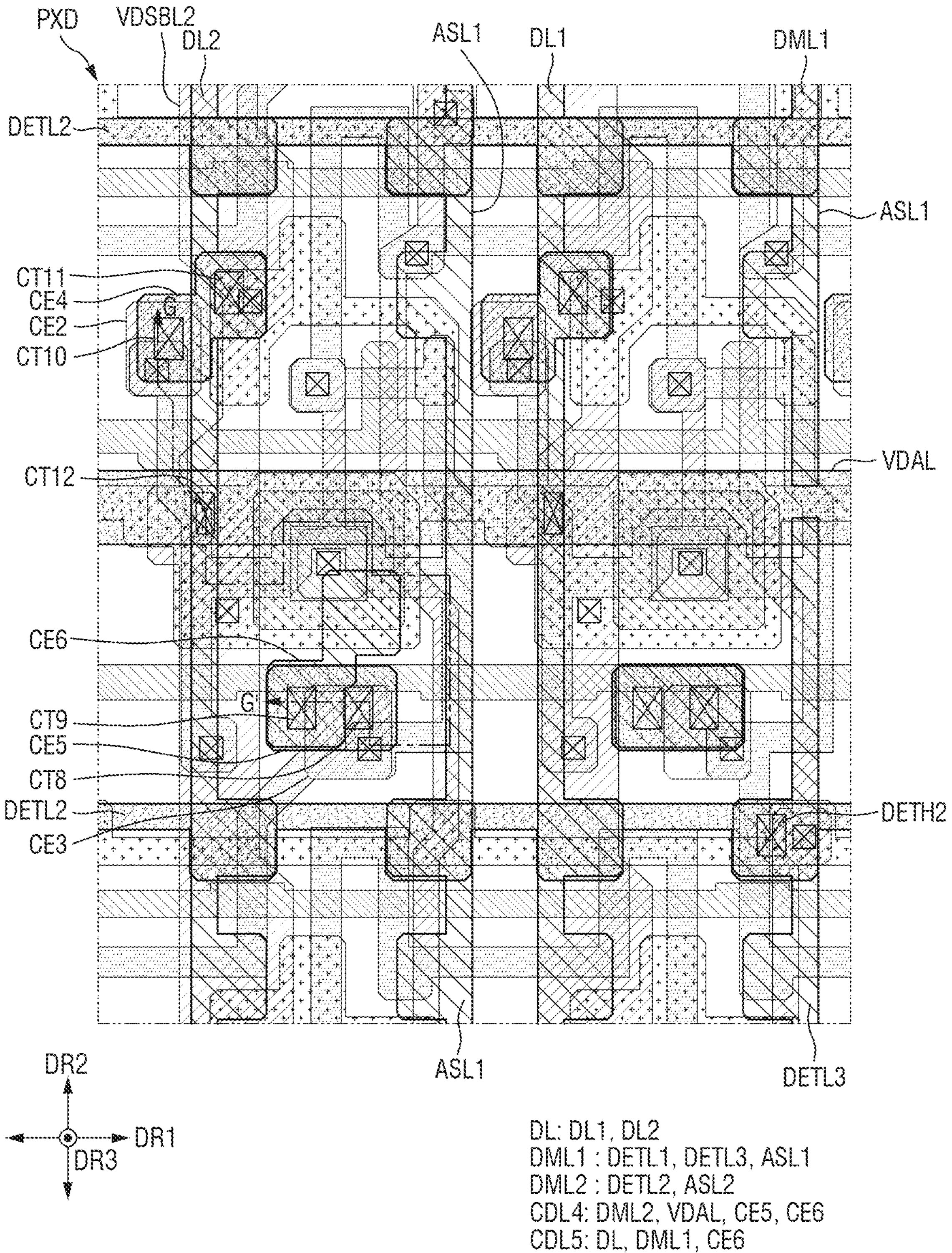
FIG. 13 is a plan view of an example of the semiconductor layer, the first conductive layer, the second conductive layer, the third conductive layer, the fourth conductive layer, and the fifth conductive layer of two pixel drivers respectively included in two adjacent emission areas of FIG. 2 according to some embodiments.
Figure 14:
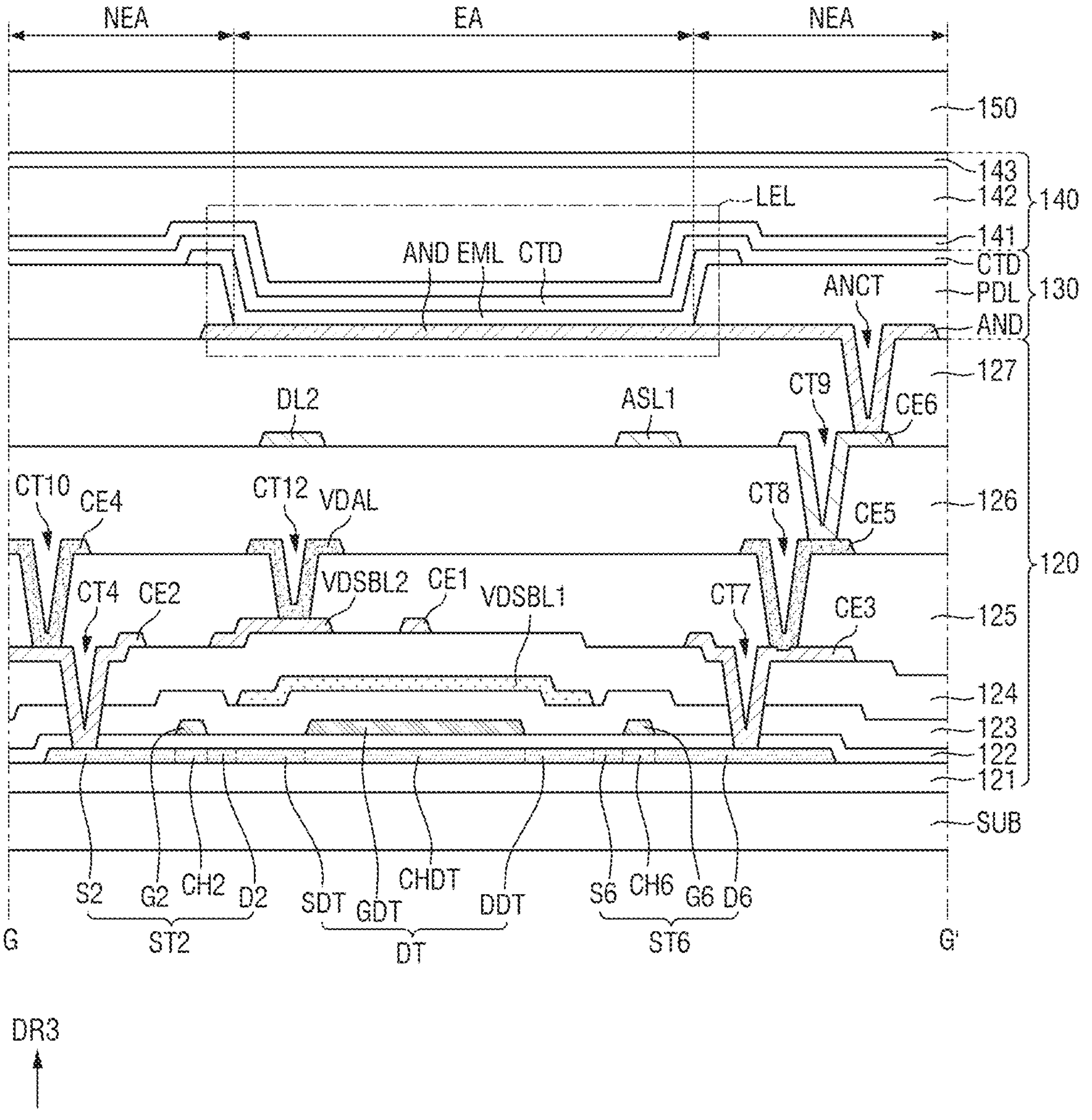
FIG. 14 is a cross-sectional view of an example of a plane cut along line G-G' of FIG. 13 according to some embodiments.

First, referring to FIG. 14, the circuit layer 120 of the display device 10 according to some embodiments may include the semiconductor layer SEL (see FIG. 12) on the substrate 110, the first conductive layer CDL1 (see FIG. 12) on the first gate insulating layer 122 (see FIG. 14) covering the semiconductor layer SEL, the second conductive layer CDL2 (see FIG. 12) on the second gate insulating layer 123 (see FIG. 14) covering the first conductive layer CDL1, the third conductive layer CDL3 (see FIG. 12) on the interlayer insulating layer 124 (see FIG. 14) covering the second conductive layer CDL2, the fourth conductive layer CDL4 (see FIG. 13) on the first planarization layer 125 (see FIG. 14) covering the third conductive layer CDL3, the fifth conductive layer CDL5 on the second planarization layer 126 (see FIG. 14) covering the fourth conductive layer CDL4, and the third planarization layer 127 (see FIG. 14) covering the fifth conductive layer CDL5.

In addition, the light emitting element layer 130 may be located on the third planarization layer 127.

FIGS. 12 and 13 illustrate an example of the pixel drivers PXD of FIG. 10 which correspond to two emission areas EA located in the first display side area DSDA1.

Referring to FIG. 12, the semiconductor layer SEL may include channel portions CHDT, CH1-1, CH1-2, CH2, CH3-1, CH3-2, CH4, CH5 and CH6, source electrodes SDT, S1-1, S1-2, S2, S3-1, S3-2, S4, S5 and S6 and drain electrodes DDT, D1-1, D1-2, D2, D3-1, D3-2, D4, D5 and D6 of a driving transistor DT and first through sixth transistors ST1 through ST6.

The first conductive layer CDL1 may include gate electrodes GDT, G1-1, G1-2, G2, G3-1, G3-2, G4, G5 and G6 of the driving transistor DT and the first through sixth transistors ST1 through ST6 in each pixel driver PXD.

In addition, the first conductive layer CDL1 may further include scan lines, that is, a write scan line GWL, an initialization scan line GIL, an emission control line ECL, and a control scan line GCL connected to the gate electrodes GDT, G1-1, G1-2, G2, G3-1, G3-2, G4, G5 and G6 of the driving transistor DT and ST1 through ST6. The write scan line GWL, the initialization scan line GIL, the emission control line ECL, and the control scan line GCL extend in the first direction DR1.

The second conductive layer CDL2 may include a gate initialization voltage line VGIL connected to the drain electrode D3-2 of the third transistor ST3 and transmitting a first initialization voltage and an anode initialization voltage line VAIL connected to the drain electrode D4 of the fourth transistor ST4 and transmitting a second initialization voltage. The gate initialization voltage line VGIL and the anode initialization voltage line VAIL may extend in the first direction DR1.

The first power line VDL may include a first power horizontal auxiliary line VDSBL1 extending in the first direction DR1 and first power vertical auxiliary lines VDSBL2 extending in the second direction DR2.

The second conductive layer CDL2 may further include the first power horizontal auxiliary line VDSBL1.

The third conductive layer CDL3 may include the first power vertical auxiliary lines VDSBL2.

The third conductive layer CDL3 may further include a gate initialization voltage auxiliary line VGIAL and an anode initialization voltage auxiliary line VAIAL.

The gate initialization voltage auxiliary line VGIAL may be electrically connected to the gate initialization voltage line VGIL and may extend in the second direction DR2.

The anode initialization voltage auxiliary line VAIAL may be electrically connected to the anode initialization voltage line VAIL and may extend in the second direction DR2.

The first power vertical auxiliary lines VDSBL2 may be electrically connected to the first power horizontal auxiliary line VDSBL1.

Specifically, the driving transistor DT may include the channel portion CHDT, the source electrode SDT and the drain electrode DDT connected to both sides of the channel portion CHDT, and the gate electrode DTG overlapping the channel portion CHDT.

The source electrode SDT of the driving transistor DT may be connected to the drain electrode D2 of the second transistor ST2 and the drain electrode D5 of the fifth transistor ST5.

The drain electrode DDT of the driving transistor DT may be connected to the source electrode S1-1 of a (1-1)$^{th}$ transistor ST1-1 and the source electrode S6 of the sixth transistor ST6.

The channel portion CHDT, the source electrode SDT, and the drain electrode DDT of the driving transistor DT may be made of the semiconductor layer SEL. The source electrode SDT and the drain electrode DDT may be portions of the semiconductor layer SEL made conductive by doping the semiconductor material with ions or impurities.

The gate electrode GDT of the driving transistor DT may be made of the first conductive layer CDL1.

The first transistor ST1 may include the (1-1)$^{th}$ transistor ST1-1 and a (1-2)$^{th}$ transistor ST1-2 connected in series to each other.

The (1-1)$^{th}$ transistor ST1-1 may include the channel portion CH1-1, the source electrode S1-1 and the drain electrode D1-1 connected to both sides of the channel portion CH1-1, and the gate electrode G1-1 overlapping the channel portion CH1-1 and formed of a portion of the write scan line GWL.

The source electrode S1-1 of the (1-1)$^{th}$ transistor ST1-1 may be connected to the drain electrode DDT of the driving transistor DT.

The drain electrode D1-1 of the (1-1)$^{th}$ transistor ST1-1 may be connected to the source electrode S1-2 of the (1-2)$^{th}$ transistor ST1-2.

The (1-2)$^{th}$ transistor ST1-2 may include the channel portion CH1-2, the source electrode S1-2 and the drain electrode D1-2 connected to both sides of the channel portion CH1-2, and the gate electrode G1-2 overlapping the channel portion CH1-2 and formed of a protruding portion of the write scan line GWL.

The source electrode S1-2 of the (1-2)$^{th}$ transistor ST1-2 may be connected to the drain electrode D1-1 of the (1-1)$^{th}$ transistor ST1-1.

The drain electrode D1-2 of the (1-2)$^{th}$ transistor ST1-2 may be connected to the source electrode S3-1 of a (3-1)$^{th}$ transistor ST3-1.

The channel portion CH1-1, the source electrode S1-1 and the drain electrode D1-1 of the (1-1)$^{th}$ transistor ST1-1 and the channel portion CH1-2, the source electrode S1-2 and the drain electrode D1-2 of the (1-2)$^{th}$ transistor ST1-2 may be made of the semiconductor layer SEL. The source electrodes S1-1 and S1-2 and the drain electrodes D1-1 and D1-2 of the (1-1)$^{th}$ transistor ST1-1 and (1-2)$^{th}$ transistor ST1-2 may be portions of the semiconductor layer SEL made conductive by doping the semiconductor material with ions or impurities.

The gate electrodes G1-1 and G1-2 of the (1-1)$^{th}$ transistor ST1-1 and the (1-2)$^{th}$ transistor ST1-2 may be different portions of the write scan line GWL made of the first conductive layer CDL1.

The gate electrode DTG of the driving transistor DT may be connected to a first connection electrode CE1 through a first contact hole CT1, and the first connection electrode CE1 may be connected to the drain electrode D1-2 of the (1-2)$^{th}$ transistor ST1-2 through a second contact hole CT2.

The first connection electrode CE1 may be made of the third conductive layer CDL3.

The second transistor ST2 may include the channel portion CH2, the source electrode S2 and drain electrode D2 connected to both sides of the channel portion CH2, and the gate electrode G2 overlapping the channel portion CH2 and formed of another portion of the write scan line GWL.

The source electrode S2 of the second transistor ST2 may be connected to a second connection electrode CE2 through a fourth contact hole CT4.

The drain electrode D2 of the second transistor ST2 may be connected to the source electrode SDT of the driving transistor DT and the drain electrode D5 of the fifth transistor ST5.

The channel portion CH2, the source electrode S2 and the drain electrode D2 of the second transistor ST2 may be made of the semiconductor layer SEL. The source electrode S2 and the drain electrode D2 may be portions of the semiconductor layer SEL made conductive by doping the semiconductor material with ions or impurities.

The gate electrode G2 of the second transistor ST2 may be a portion of the write scan line GWL made of the first conductive layer CDL1.

The second connection electrode CE2 may be made of the third conductive layer CDL3.

The third transistor ST3 may include the (3-1)$^{th}$ transistor ST3-1 and a (3-2)$^{th}$ transistor ST3-2 connected in series to each other.

The (3-1)$^{th}$ transistor ST3-1 may include the channel portion CH3-1, the source electrode S3-1 and the drain electrode D3-1 connected to both sides of the channel portion CH3-1, and the gate electrode G3-1 overlapping the channel portion CH3-1.

The source electrode S3-1 of the (3-1)$^{th}$ transistor ST3-1 may be connected to the drain electrode D1-2 of the (1-2)$^{th}$ transistor ST1-2.

The drain electrode D3-1 of the (3-1)$^{th}$ transistor ST3-1 may be connected to the source electrode S3-2 of the (3-2)$^{th}$ transistor ST3-2.

The (3-2)$^{th}$ transistor ST3-2 may include the channel portion CH3-2, the source electrode S3-2 and the drain electrode D3-2 connected to both sides of the channel portion CH3-2, and the gate electrode G3-2 overlapping the channel portion CH3-2.

The drain electrode D3-2 of the (3-2)$^{th}$ transistor ST3-2 may be connected to the gate initialization auxiliary line VGIAL through a second initialization contact hole VICH2.

The channel portion CH3-1, the source electrode S3-1 and the drain electrode D3-1 of the (3-1)$^{th}$ transistor ST3-1 and the channel portion CH3-2, the source electrode S3-2 and the drain electrode D3-2 of the (3-2)$^{th}$ transistor ST3-2 may be made of the semiconductor layer SEL. The source electrodes S3-1 and S3-2 and the drain electrodes D3-1 and D3-2 of the (3-1)$^{th}$ transistor ST3-1 and the (3-2)$^{th}$ transistor ST3-2 may be portions of the semiconductor layer SEL made conductive by doping the semiconductor material with ions or impurities.

The gate electrodes G3-1 and G3-2 of the (3-1)$^{th}$ transistor ST3-1 and the (3-2)$^{th}$ transistor ST3-2 may be different portions of the initialization scan line GIL made of the first conductive layer CDL1.

The circuit layer 120 may further include a shielding electrode SHE overlapping at least a portion of the source electrode S3-1 of the (3-2)$^{th}$ transistor ST3-2.

The shielding electrode SHE may be made of the second conductive layer CDL2.

The shielding electrode SHE may be connected to each of the first power vertical auxiliary lines VDSBL2 through a third contact hole CT3.

The shielding electrode SHE may further overlap a portion of the drain electrode D1-1 of the $(1-1)^{th}$ transistor ST1-1.

Each of the first power vertical auxiliary lines VDSBL2 may be connected to the first power horizontal auxiliary line VDSBL1 through a fifth contact hole CT5.

The fourth transistor ST4 may include the channel portion CH4, the source electrode S4 and the drain electrode D4 connected to both sides of the channel portion CH4, and the gate electrode G4 overlapping the channel portion CH4 and formed of a portion of the control scan line GCL.

The source electrode S4 of the fourth transistor ST4 may be connected to the drain electrode D6 of the sixth transistor ST6.

The drain electrode D4 of the fourth transistor ST4 may be connected to the anode initialization auxiliary line VAIAL through a fourth initialization contact hole VACH2.

The channel portion CH4, the source electrode S4 and the drain electrode D4 of the fourth transistor ST4 may be made of the semiconductor layer SEL. The source electrode S4 and the drain electrode D4 may be portions of the semiconductor layer SEL made conductive by doping the semiconductor material with ions or impurities.

The gate electrode G4 of the fourth transistor ST4 may be a portion of the control scan line GCL made of the first conductive layer CDL1.

The fifth transistor ST5 may include the channel portion CH5, the source electrode S5 and the drain electrode D5 connected to both sides of the channel portion CH5, and the gate electrode G5 overlapping the channel portion CH5 and formed of a portion of the emission control line ECL.

The source electrode S5 of the fifth transistor ST5 may be connected to each of the first power vertical auxiliary lines VDSBL2 through a sixth contact hole CT6.

The drain electrode D5 of the fifth transistor ST5 may be connected to the source electrode SDT of the driving transistor DT.

The sixth transistor ST6 may include the channel portion CH6, the source electrode S6 and the drain electrode D6 connected to both sides of the channel portion CH6, and the gate electrode G6 overlapping the channel portion CH6 and formed of another portion of the emission control line ECL.

The source electrode S6 of the sixth transistor ST6 may be connected to the drain electrode DDT of the driving transistor DT.

The drain electrode D6 of the sixth transistor ST6 may be connected to the source electrode S4 of the fourth transistor ST4 and may be connected to a third connection electrode CE3 through a seventh contact hole CT7.

The third connection electrode CE3 may be made of the third conductive layer CDL3.

The channel portion CH5, the source electrode S5 and the drain electrode D5 of the fifth transistor ST5 may be made of the semiconductor layer SEL. The source electrode S5 and the drain electrode D5 may be portions of the semiconductor layer SEL made conductive by doping the semiconductor material with ions or impurities.

The channel portion CH6, the source electrode S6 and the drain electrode D6 of the sixth transistor ST6 may be made of the semiconductor layer SEL. The source electrode S6 and the drain electrode D6 may be portions of the semiconductor layer SEL made conductive by doping the semiconductor material with ions or impurities.

The gate electrodes G5 and G6 of the fifth transistor ST5 and the sixth transistor ST6 may be different portions of the emission control line ECL made of the first conductive layer CDL1.

A capacitor C1 may be provided by the overlap of a first capacitor electrode CAE1 and a second capacitor electrode CAE2.

Here, the first capacitor electrode CAE1 may be a portion of the gate electrode GDT of the driving transistor DT made of the first conductive layer CDL1.

The second capacitor electrode CAE2 may be a portion of the first power horizontal auxiliary line VDSBL1 made of the second conductive layer CDL2.

The second connection electrode CE2 is connected to the source electrode S2 of the second transistor ST2 through the fourth contact hole CT4.

Referring to FIG. 13, the data lines DL include the first and second data lines DL1 and DL2 located in the first display side area DSDA1.

The first dummy lines DML1 respectively neighboring the data lines DL include the first and third detour lines DETL1 and DETL3 of the input detour lines DETL and the first auxiliary lines ASL1 other than the first and third detour lines DETL1 and DETL3.

The data lines DL and the first dummy lines DML1 may extend in the second direction DR2 and may be made of the fifth conductive layer CDL5.

In addition, the circuit layer 120 may include the first power auxiliary lines VDAL and the second dummy lines DML2 extending in the first direction DR1.

The second dummy lines DML2 include the second detour lines DETL2 of the input detour lines DETL and the second auxiliary lines ASL2 other than the second detour lines DETL2.

The second dummy lines DML2 and the first power auxiliary lines VDAL may be made of the fourth conductive layer CDL4 and may be alternately located in the second direction DR2.

A fourth connection electrode CE4 may be made of the fourth conductive layer CDL4 and may be connected to the second connection electrode CE2 through a tenth contact hole CT10.

Each of the data lines DL made of the fifth conductive layer CDL5 may be connected to the fourth connection electrode CE4 through an eleventh contact hole CT11.

Therefore, the source electrode S2 of the second transistor ST2 may be connected to each data line DL through the second connection electrode CE2 and the fourth connection electrode CE4.

Each of the first power auxiliary lines VDAL may be electrically connected to each of the first power vertical auxiliary lines VDSBL2 of the third conductive layer CDL3 through a twelfth contact hole CT12.

As illustrated in FIG. 12, the third connection electrode CE3 made of the third conductive layer CDL3 is connected to the source electrode S4 of the fourth transistor ST4 and the drain electrode D6 of the sixth transistor ST6, which are made of the semiconductor layer SEL, through the seventh contact hole CT7.

As illustrated in FIG. 13, a fifth connection electrode CE5 made of the fourth conductive layer CDL4 may be connected to the third connection electrode CE3 through an eighth contact hole CT8.

A sixth connection electrode CE6 made of the fifth conductive layer CDL5 may be connected to the fifth connection electrode CE5 through a ninth contact hole CT9.

Therefore, the sixth connection electrode CE6 may be connected to the source electrode S4 of the fourth transistor ST4 and the drain electrode D6 of the sixth transistor ST6 through the third connection electrode CE3 and the fifth connection electrode CE5.

The sixth connection electrode CE6 may be connected to the anode of a light emitting element LEL through an anode contact hole ANCT (see FIG. 14) penetrating the third planarization layer 127.

In the first display side area DSDA1, each third detour line DETL3 may be electrically connected to a second detour line DETL2 through a second bypass connection hole DETH2 penetrating the second planarization layer 126.

As illustrated in FIG. 14, the circuit layer 120 may include the semiconductor layer SEL on the substrate 110, the first conductive layer CDL1 on the first gate insulating layer 122 covering the semiconductor layer SEL, the second conductive layer CDL2 on the second gate insulating layer 123 covering the first conductive layer CDL1, the third conductive layer CDL3 on the interlayer insulating layer 124 covering the second conductive layer CDL2, the fourth conductive layer CDL4 on the first planarization layer 125 covering the third conductive layer CDL3, the fifth conductive layer CDL5 on the second planarization layer 126 covering the fourth conductive layer CDL4, and the third planarization layer 127 covering the fifth conductive layer CDL5.

The circuit layer 120 may further include a buffer layer 121 located between the substrate 110 and the semiconductor layer SEL.

The buffer layer 121 is designed to protect the circuit layer 120 and the light emitting element layer 130 from moisture introduced through the substrate 110 and may be made of at least one inorganic layer.

For example, the buffer layer 121 may be a multilayer in which one or more inorganic layers selected from silicon nitride, silicon oxynitride, silicon oxide, titanium oxide, and aluminum oxide are alternately stacked.

The semiconductor layer SEL may be located on the buffer layer 121 and may be made of a silicon semiconductor such as polycrystalline silicon, monocrystalline silicon, low-temperature polycrystalline silicon, or amorphous silicon.

The semiconductor layer SEL may include the channel portions CHDT, CH1-1, CH1-2, CH2, CH3-1, CH3-2, CH4, CH5 and CH6 (see FIG. 12) of the driving transistor DT and the switch elements ST1 through ST6 provided in each pixel driver PXD.

In addition, the semiconductor layer SEL may further include the source electrodes SDT, S1-1, S1-2, S2, S3-1, S3-2, S4, S5 and S6 (see FIG. 12) and the drain electrodes DDT, D1-1, D1-2, D2, D3-1, D3-2, D4, D5 and D6 (see FIG. 12) of the driving transistor DT and the switch elements ST1 through ST6.

Portions of the semiconductor layer SEL which correspond to the source electrodes SDT, S1-1, S1-2, S2, S3-1, S3-2, S4, S5 and S6 (see FIG. 12) and the drain electrodes DDT, D1-1, D1-2, D2, D3-1, D3-2, D4, D5 and D6 (see FIG. 12) of the driving transistor DT and the switch elements ST1 through ST6 may be doped with ions or impurities to have conductivity.

On the other hand, portions of the semiconductor layer SEL which correspond to the channel portions CHDT, CH1-1, CH1-2, CH2, CH3-1, CH3-2, CH4, CH5 and CH6 (see FIG. 12) of the driving transistor DT and the switch elements ST1 through ST6 may not be doped due to the gate electrodes GDT, G1-1, G1-2, G2, G3-1, G3-2, G4, G5 and G6 and may maintain semiconductor characteristics of generating channels that serve as passages through which carriers move according to a potential difference.

The first gate insulating layer 122 may be made of an inorganic layer located on the buffer layer 121 and covering the semiconductor layer SEL.

For example, the first gate insulating layer 122 may be made of an inorganic layer such as a silicon nitride layer, a silicon oxynitride layer, a silicon oxide layer, a titanium oxide layer, or an aluminum oxide layer.

The first conductive layer CDL1 is located on the first gate insulating layer 122.

The first conductive layer CDL1 may include the gate electrodes GDT, G1-1, G1-2, G2, G3-1, G3-2, G4, G5 and G6 of the driving transistor DT and the switch elements ST1 through ST6 provided in each pixel driver PXD.

The first conductive layer CDL1 may further include the write scan line GWL, the initialization scan line GIL, the control scan line GCL and the emission control line ECL connected to the gate electrodes G1-1, G1-2, G2, G3-1, G3-2, G4, G5 and G6 of the first through sixth transistors ST1 through ST6 provided in each pixel driver PXD and extending in the first direction DR1.

The first conductive layer CDL1 may be a single layer or a multilayer made of any one or more of molybdenum (Mo), aluminum (Al), chromium (Cr), gold (Au), titanium (Ti), nickel (Ni), neodymium (Nd), copper (Cu), and alloys thereof.

The second gate insulating layer 123 may be made of an inorganic layer located on the first gate insulating layer 122 and covering the first conductive layer CDL1.

For example, the second gate insulating layer 123 may be made of an inorganic layer such as a silicon nitride layer, a silicon oxynitride layer, a silicon oxide layer, a titanium oxide layer, or an aluminum oxide layer.

The second conductive layer CDL2 is located on the second gate insulating layer 123.

The second conductive layer CDL2 may include the shielding electrode SHE, the first power horizontal auxiliary line VDSBL1, the gate initialization voltage line VGIL, and the anode initialization voltage line VAIL.

The second conductive layer CDL2 may be a single layer or a multilayer made of any one or more of molybdenum (Mo), aluminum (Al), chromium (Cr), gold (Au), titanium (Ti), nickel (Ni), neodymium (Nd), copper (Cu), and alloys thereof.

The interlayer insulating layer 124 may be made of an inorganic layer located on the second gate insulating layer 123 and covering the second conductive layer CDL2.

For example, the interlayer insulating layer 124 may be made of an inorganic layer such as a silicon nitride layer, a silicon oxynitride layer, a silicon oxide layer, a titanium oxide layer, or an aluminum oxide layer.

The third conductive layer CDL3 is located on the interlayer insulating layer 124.

The third conductive layer CDL3 may include the first connection electrode CE1, the second connection electrode CE2, the third connection electrode CE3, the first power vertical auxiliary lines VDSBL2, the gate initialization voltage auxiliary line VGIAL, and the anode initialization voltage auxiliary line VAIAL.

Referring to FIGS. 12 and 14, each pixel driver PXD may include the first contact hole CT1, the second contact hole CT2, the third contact hole CT3, the fourth contact hole CT4, the fifth contact hole CT5, the sixth contact hole CT6, and the seventh contact hole CT7.

The first contact hole CT1 is designed to connect the first connection electrode CE1 and the gate electrode GDT of the driving transistor DT.

The first contact hole CT1 may correspond to a portion of the gate electrode GDT of the driving transistor DT and may penetrate the second gate insulating layer 123 and the interlayer insulating layer 124. Therefore, the first connection electrode CE1 made of the third conductive layer CDL3 may be electrically connected to the gate electrode GDT of the driving transistor DT made of the first conductive layer CDL1 through the first contact hole CT1.

The second contact hole CT2 is designed to connect any one of the drain electrode D1-2 of the $(1-2)^{th}$ transistor ST1-2 and the source electrode S3-1 of the $(3-1)^{th}$ transistor ST3-1. The drain electrode D1-2 of the $(1-2)^{th}$ transistor ST1-2 and the source electrode S3-1 of the $(3-1)^{th}$ transistor ST3-1 are connected to each other.

The second contact hole CT2 may correspond to a portion of any one of the drain electrode D1-2 of the $(1-2)^{th}$ transistor ST1-2 and the source electrode S3-1 of the $(3-1)^{th}$ transistor ST3-1 and may penetrate the first gate insulating layer 122, the second gate insulating layer 123 and the interlayer insulating layer 124. Therefore, the first connection electrode CE1 made of the third conductive layer CDL3 may be electrically connected to the drain electrode D1-2 of the $(1-2)^{th}$ transistor ST1-2 and the source electrode S3-1 of the $(3-1)^{th}$ transistor ST3-1, which are made of the semiconductor layer SEL, through the second contact hole CT2.

In addition, the gate electrode GDT of the driving transistor DT may be electrically connected to the drain electrode D1-2 of the $(1-2)^{th}$ transistor ST1-2 and the source electrode S3-1 of the $(3-1)^{th}$ transistor ST3-1 through the first contact hole CT1, the second contact hole CT2, and the first connection electrode CE1.

The third contact hole CT3 is designed to connect the shielding electrode SHE and each of the first power vertical auxiliary lines VDSBL2.

The third contact hole CT3 may correspond to a portion of each first power vertical auxiliary line VDSBL2 and may penetrate the interlayer insulating layer 124. Therefore, the shielding electrode SHE made of the second conductive layer CDL2 may be electrically connected to each first power vertical auxiliary line VDSBL2 made of the third conductive layer CDL3 through the third contact hole CT3.

The fourth contact hole CT4 is designed to connect the second connection electrode CE2 and the source electrode S2 of the second transistor ST2.

The fourth contact hole CT4 may correspond to a portion of the source electrode S2 of the second transistor ST2 and may penetrate the first gate insulating layer 122, the second gate insulating layer 123 and the interlayer insulating layer 124. Therefore, the second connection electrode CE2 made of the third conductive layer CDL3 may be electrically connected to the source electrode S2 of the second transistor ST2 made of the semiconductor layer SEL through the fourth contact hole CT4.

The fifth contact hole CT5 is designed to connect the first power horizontal auxiliary line VDSBL1 and each of the first power vertical auxiliary lines VDSBL2.

The fifth contact hole CT5 may correspond to a portion of the first power horizontal auxiliary line VDSBL1 and may penetrate the interlayer insulating layer 124. Therefore, each of the first power vertical auxiliary lines VDSBL2 made of the third conductive layer CDL3 may be electrically connected to the first power horizontal auxiliary line VDSBL1 made of the second conductive layer CDL2 through the fifth contact hole CT5.

The sixth contact hole CT6 is designed to connect each of the first power vertical auxiliary lines VDSBL2 and the source electrode S5 of the fifth transistor ST5.

The sixth contact hole CT6 may correspond to a portion of the source electrode S5 of the fifth transistor ST5 and may penetrate the first gate insulating layer 122, the second gate insulating layer 123 and the interlayer insulating layer 124. Therefore, each of the first power vertical auxiliary lines VDSBL2 made of the third conductive layer CDL3 may be electrically connected to the source electrode S5 of the fifth transistor ST5 made of the semiconductor layer SEL through the sixth contact hole CT6.

The seventh contact hole CT7 is designed to connect the third connection electrode CE3 and the drain electrode D5 of the fifth transistor ST5.

The seventh contact hole CT7 may correspond to a portion of the drain electrode D5 of the fifth transistor ST5 and may penetrate the first gate insulating layer 122, the second gate insulating layer 123 and the interlayer insulating layer 124. Therefore, the third connection electrode CE3 made of the third conductive layer CDL3 may be electrically connected to the drain electrode D5 of the fifth transistor ST5 made of the semiconductor layer SEL through the seventh contact hole CT7.

The third conductive layer CDL3 may have a multilayer structure including a metal layer having a low-resistance property and metal layers having an ion diffusion preventing property and located on upper and lower surfaces of the above metal layer, respectively.

For example, the third conductive layer CDL3 may have a stacked structure of metal layers, and each of the metal layers of the third conductive layer CDL3 may be made of any one of molybdenum (Mo), aluminum (Al), chromium (Cr), gold (Au), titanium (Ti), nickel (Ni), neodymium (Nd), and copper (Cu).

Specifically, the metal layer having a low-resistance property may be made of any one of aluminum (Al), chromium (Cr), gold (Au), nickel (Ni), neodymium (Nd), and copper (Cu).

The metal layers having an ion diffusion preventing property may be made of titanium (Ti).

That is, the third conductive layer CDL3 may have a stacked structure (T1/Al/Ti) of titanium (Ti)/aluminum (Al)/titanium (Ti).

The first planarization layer 125 covering the third conductive layer CDL3 may be made of an organic layer such as acryl resin, epoxy resin, phenolic resin, polyamide resin, or polyimide resin.

The fourth conductive layer CDL4 is located on the first planarization layer 125.

As illustrated in FIG. 13, the fourth conductive layer CDL4 may include the first power auxiliary lines VDAL, the second dummy lines DML2, the fourth connection electrode CE4, and the fifth connection electrode CE5.

The second dummy lines DML2 include the second detour lines DETL2 and the second auxiliary lines ASL2.

The fourth conductive layer CDL4 may be a single layer or a multilayer made of any one or more of molybdenum (Mo), aluminum (Al), chromium (Cr), gold (Au), titanium (Ti), nickel (Ni), neodymium (Nd), copper (Cu), and alloys thereof.

Like the third conductive layer CDL3, the fourth conductive layer CDL4 may have a stacked structure of metal layers, and each of the metal layers of the third conductive layer CDL3 may be made of any one of molybdenum (Mo), aluminum (Al), chromium (Cr), gold (Au), titanium (Ti), nickel (Ni), neodymium (Nd), and copper (Cu).

That is, the fourth conductive layer CDL4 may have a stacked structure (T1/Al/Ti) of titanium (Ti)/aluminum (Al)/titanium (Ti).

The second planarization layer 126 covering the fourth conductive layer CDL4 may be made of an organic layer such as acryl resin, epoxy resin, phenolic resin, polyamide resin, or polyimide resin.

The fifth conductive layer CDL5 is located on the second planarization layer 126.

As illustrated in FIG. 13, the fifth conductive layer CDL5 may include the data lines DL, the first dummy lines DML1, and the sixth connection electrode CE6.

The first dummy lines DML1 include the first detour lines DETL1, the third detour lines DETL3, and the first auxiliary lines ASL1.

The fifth conductive layer CDL5 may be a single layer or a multilayer made of any one or more of molybdenum (Mo), aluminum (Al), chromium (Cr), gold (Au), titanium (Ti), nickel (Ni), neodymium (Nd), copper (Cu), and alloys thereof.

As illustrated in FIG. 14, the third planarization layer 127 covering the fifth conductive layer CDL5 may be made of an organic layer such as acryl resin, epoxy resin, phenolic resin, polyamide resin, or polyimide resin.

Referring to FIGS. 13 and 14, each pixel driver PXD may further include the eighth contact hole CT8, the ninth contact hole CT9, the tenth contact hole CT10, and the eleventh contact hole CT11.

The eighth contact hole CT8 is designed to connect the fifth connection electrode CE5 and the third connection electrode CE3.

The eighth contact hole CT8 may correspond to a portion of the third connection electrode CE3 and may penetrate the first planarization layer 125. Therefore, the fifth connection electrode CE5 made of the fourth conductive layer CDL4 may be electrically connected to the third connection electrode CE3 made of the third conductive layer CDL3 through the eighth contact hole CT8.

The ninth contact hole CT9 is designed to connect the fifth connection electrode CE5 and the sixth connection electrode CE6.

The ninth contact hole CT9 may correspond to another portion of the fifth connection electrode CE5 and may penetrate the second planarization layer 126. Therefore, the sixth connection electrode CE6 made of the fifth conductive layer CDL5 may be electrically connected to the fifth connection electrode CE5 made of the fourth conductive layer CDL4 through the ninth contact hole CT9.

The tenth contact hole CT10 is designed to connect the fourth connection electrode CE4 and the second connection electrode CE2.

The tenth contact hole CT10 may correspond to a portion of the second connection electrode CE2 and may penetrate the first planarization layer 125. Therefore, the fourth connection electrode CE4 made of the fourth conductive layer CDL4 may be electrically connected to the second connection electrode CE2 made of the third conductive layer CDL3 through the tenth contact hole CT10.

The eleventh contact hole CT11 is designed to connect the fourth connection electrode CE4 and each of the data lines DL.

The eleventh contact hole CT11 may correspond to another portion of the fourth connection electrode CE4 and may penetrate the second planarization layer 126. Therefore, each of the data lines DL made of the fifth conductive layer CDL5 may be electrically connected to the fourth connection electrode CE4 made of the fourth conductive layer CDL4 through the eleventh contact hole CT11.

As illustrated in FIG. 14, the light emitting element layer 130 may be located on the third planarization layer 127 of the circuit layer 120.

For example, the light emitting element layer 130 may include a plurality of anodes AND which are located on the third planarization layer 127, correspond to a plurality of emission areas EA, respectively, and are electrically connected to a plurality of pixel drivers PXD, respectively, a pixel defining layer PDL which is located on the third planarization layer 127, corresponds to the non-emission area NEA between the emission areas EA and covers edges of the anodes AND, a plurality of light emitting layers EML which correspond to the emission areas EA, respectively, and are located on the anodes AND, respectively, and a cathode CTD which corresponds to the emission areas EA, is located on the pixel definition layer PDL and the light emitting layers EML and is connected to the second power supply line VSSPL.

Each of the anodes AND may be connected to the sixth connection electrode CE6 through the anode contact hole ANCT penetrating the third planarization layer 127.

Accordingly, each of the anodes AND may be electrically connected to the drain electrode DDT of the driving transistor DT through the seventh contact hole CT7, the third connection electrode CE3, the eighth contact hole CT8, the fifth connection electrode CE5, the ninth contact hole CT9, the sixth connection electrode CE6, and the anode contact hole ANCT.

The pixel defining layer PDL may be made of an organic layer.

The light emitting layers EML may include an organic light emitting material.

According to some embodiments, a first common layer including at least a hole transport material may be located between the anodes AND and the light emitting layers EML.

In addition, a second common layer including at least an electron transport material may be located between the light emitting layers EML and the cathode CTD.

The cathode CTD may correspond to the entire display area DA.

According to some embodiments, the cathode CTD may be connected to the second power supply line VSSPL in the non-display area NDA.

Accordingly, the light emitting element layer 130 may include a plurality of light emitting elements LEL respectively corresponding to the emission areas EA and each including an anode AND and the cathode CTD facing each other and a light emitting layer EML interposed between them.

The light emitting element layer 130 may be covered with the sealing layer 140 for blocking penetration of oxygen or moisture.

The sealing layer 140 may cover the light emitting element layer 130 and may have a structure in which at least one inorganic layer and at least one organic layer are alternately stacked.

For example, the sealing layer 140 may include a first inorganic layer 141 which covers the cathode CTD, contacts the interlayer insulating layer 124 in the non-display area NDA and is made of an inorganic insulating material, an organic layer 142 which is located on the first inorganic layer 141, corresponds to the display area DA and is made of an organic insulating material, and a second inorganic layer 143 which covers the organic layer 142, contacts the first inorganic layer 141 in the non-display area NDA and is made of an inorganic insulating material.

Figure 15:
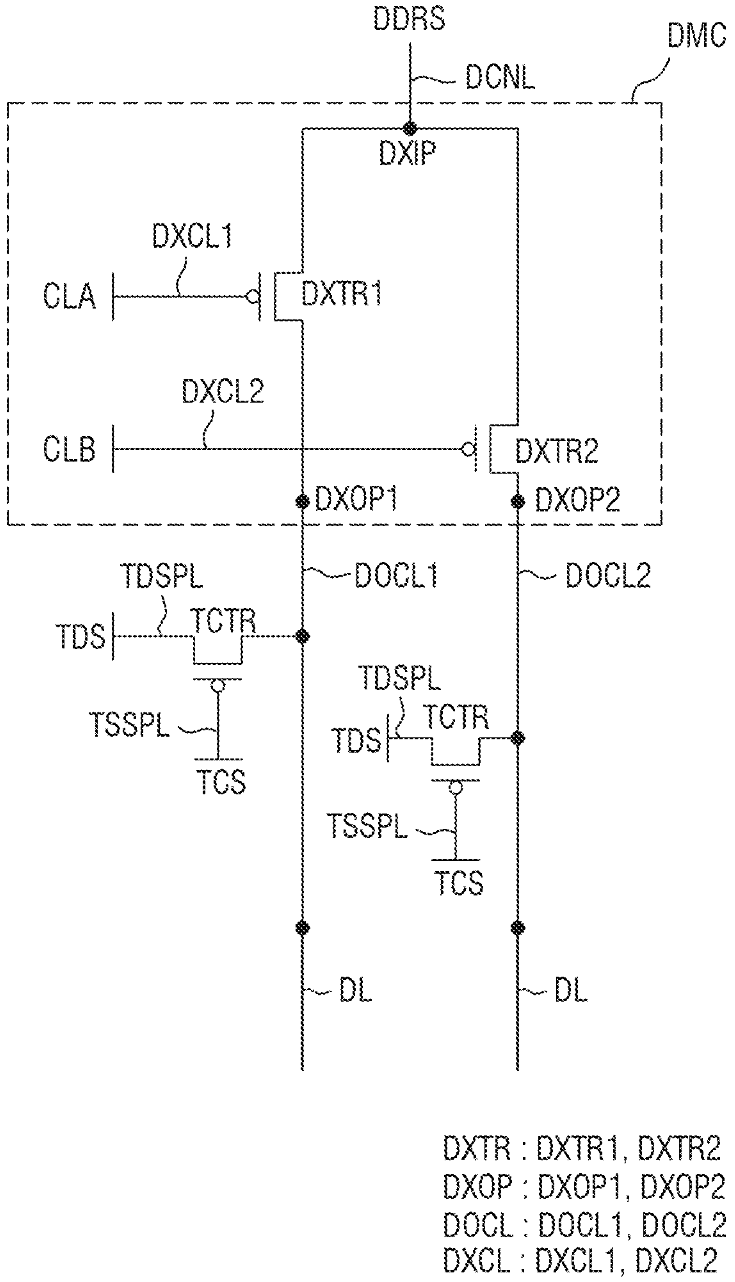
FIG. 15 is an equivalent circuit diagram illustrating electrical connection between a demultiplexer (demux) circuit unit, test control transistors, and data lines illustrated in FIGS. 5 and 8 according to some embodiments.
Figure 16:
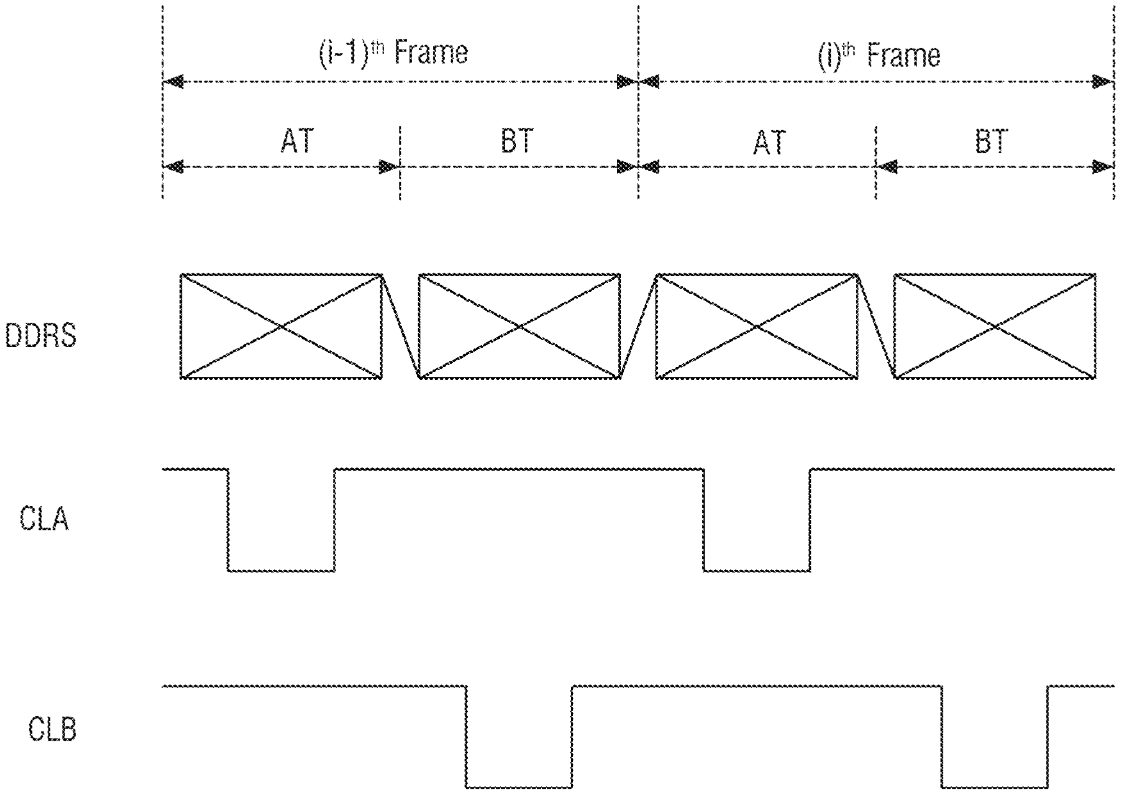
FIG. 16 is a timing diagram illustrating a data driving signal and demux control signals of FIG. 15 according to some embodiments.

FIG. 15 is an equivalent circuit diagram illustrating electrical connection between a demux circuit unit DMX, test control transistors TCTR, and data lines DL illustrated in FIGS. 5 and 8. FIG. 16 is a timing diagram illustrating a data driving signal DDRS and demux control signals CLA and CLB of FIG. 15.

Referring to FIG. 15, one of the demux circuit units DMC may include an input terminal DXIP electrically connected to the display driving circuit 200, two or more output terminals DXOP electrically connected to two or more data lines DL, respectively, and two or more demux transistors DXTR electrically connected between the two or more output terminals DXOP and the input terminal DXIP, respectively.

The circuit layer 120 of the display device 10 according to some embodiments may further include the output connection lines DOCL electrically connecting the output terminals DXOP of the demux circuit units DMC and the data lines DL, respectively, and two or more demux control lines DXCL electrically connected to gate electrodes of the two or more demux transistors DXTR, respectively.

For example, one demux circuit unit DMC may be connected to two data lines DL.

In this case, the demux circuit unit DMC may include a first demux transistor DXTR1 connected between a first output terminal DXOP1 and the input terminal DXIP and a second demux transistor DXTR2 connected between a second output terminal DXOP2 and the input terminal DXIP.

In addition, the circuit layer 120 may include a first output connection line DOCL1 electrically connecting the first output terminal DXOP1 of one demux circuit unit DMC and one data line DL, a second output connection line DOCL2 electrically connecting the second output terminal DXOP2 of the demux circuit unit DMC and another data line DL, a first demux control line DXCL1 electrically connected to a gate electrode of the first demux transistor DXTR1, and a second demux control line DXCL2 electrically connected to a gate electrode of the second demux transistor DXTR2.

Referring to FIG. 16, image frames (an $(i-1)^{th}$ frame and an $(i)^{th}$ frame) may each include a first output period AT and a second output period BT.

A first demux control signal CLA of the first demux control line DXCL1 may be output at a turn-on level during the first output period AT, and a second demux control signal CLB of the second demux control line DXCL2 may be output at a turn-on level during the second output period BT.

In this case, during the first output period AT, the first demux transistor DXTR1 may be turned on to allow a data driving signal DDRS to be output to one data line DL through the first output terminal DXOP1 as a data signal. During the second output period BT, the second demux transistor DXTR2 may be turned on to allow the data driving signal DDRS to be output to another data line DL through the second output terminal DXOP2 as a data signal.

That is, the data driving signal DDRS may be time-multiplexed into the first output period AT and the second output period BT by the demux circuit unit DMC.

As illustrated in FIG. 15, the circuit layer 120 of the display device 10 according to some embodiments may further include the test data supply line TDSPL transmitting the test data signal TDS for testing the lighting of the light emitting elements LEL, the test control supply line TSPL transmitting the test control signal TCS for controlling whether to transmit the test data signal TDS, and test control transistors TCTR electrically connected between the data lines DL and the test data supply line TDSPL, respectively.

Gate electrodes of the test control transistors TCTR may be electrically connected to the test control supply line TCSPL.

In this case, when the test control signal TCS of the test control supply line TCSPL becomes a turn-on level and when the test data signal TDS is transmitted through the test data supply line TDSPL, the test data signal TDS is transmitted to the data lines DL. At this time, the pixel drivers PXD of the emission areas EA transmit driving signals corresponding to the test data signal TDS to the light emitting elements LEL, respectively, thereby testing the lighting of the light emitting elements LEL.

Figure 17:
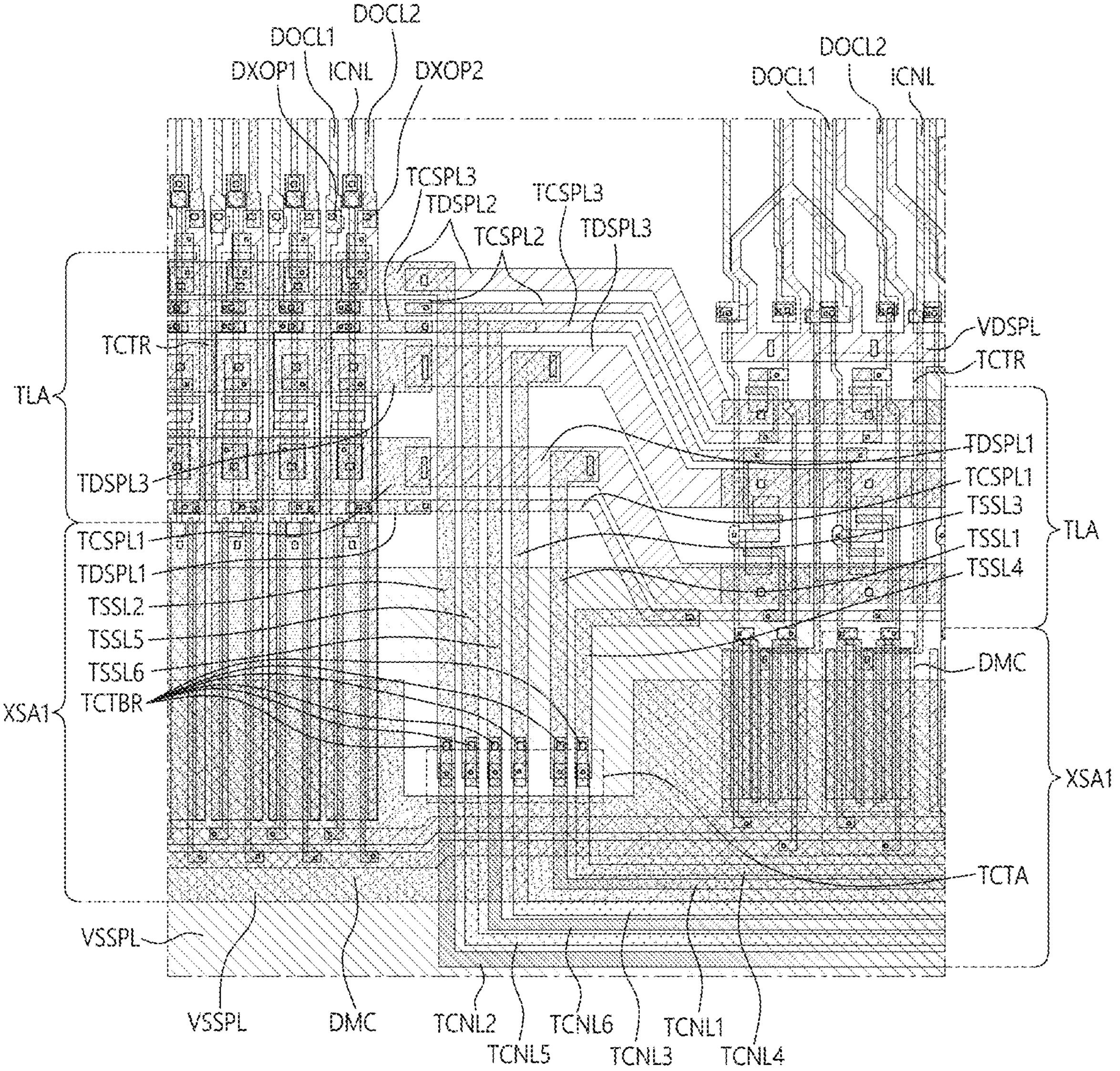
FIG. 17 is a plan view of an example of a portion of a first demux side area including a test connection area and a test connection auxiliary area in FIG. 5 according to some embodiments.
Figure 18:
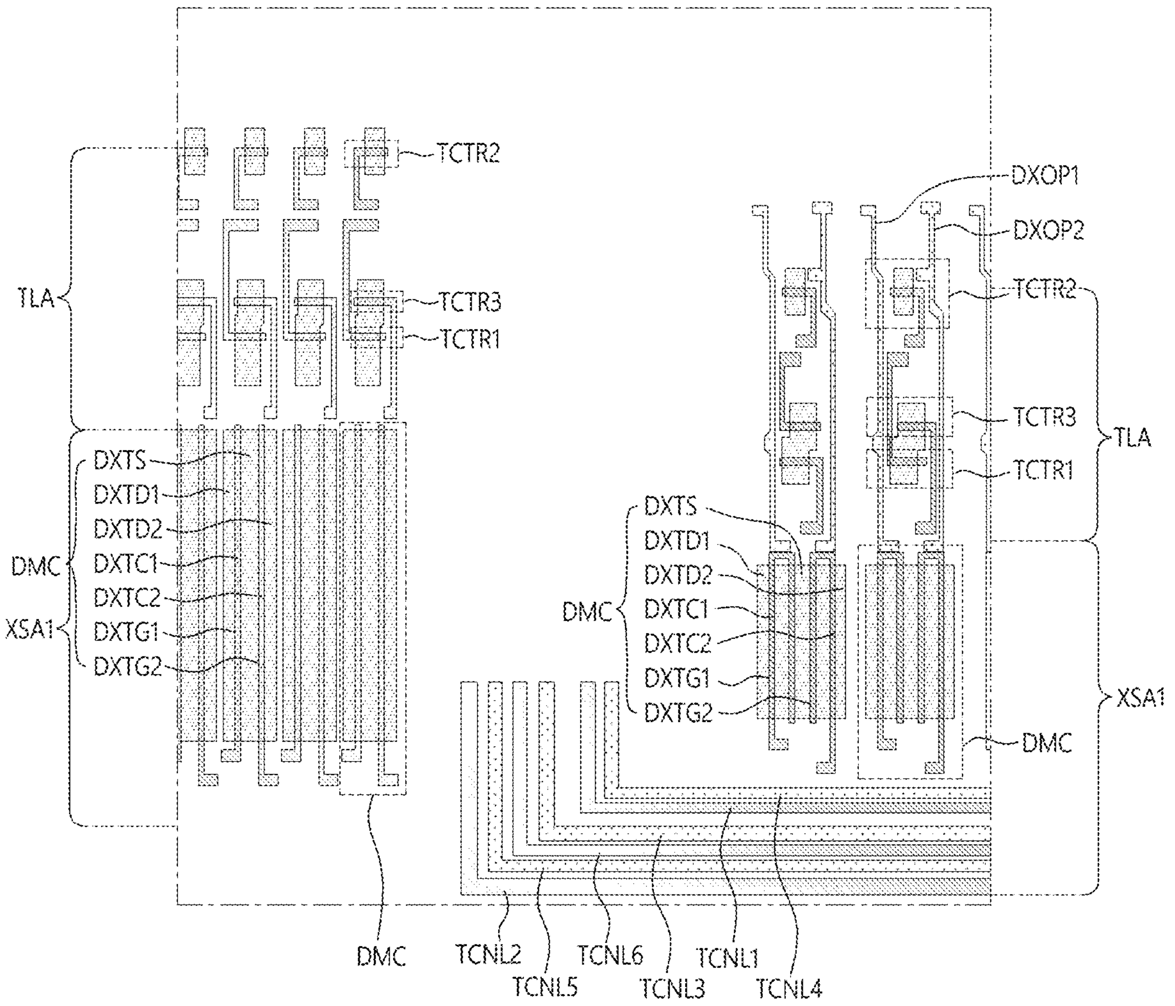
FIG. 18 is a plan view of the semiconductor layer, the first conductive layer, and the second conductive layer in FIG. 17 according to some embodiments.
Figure 19:
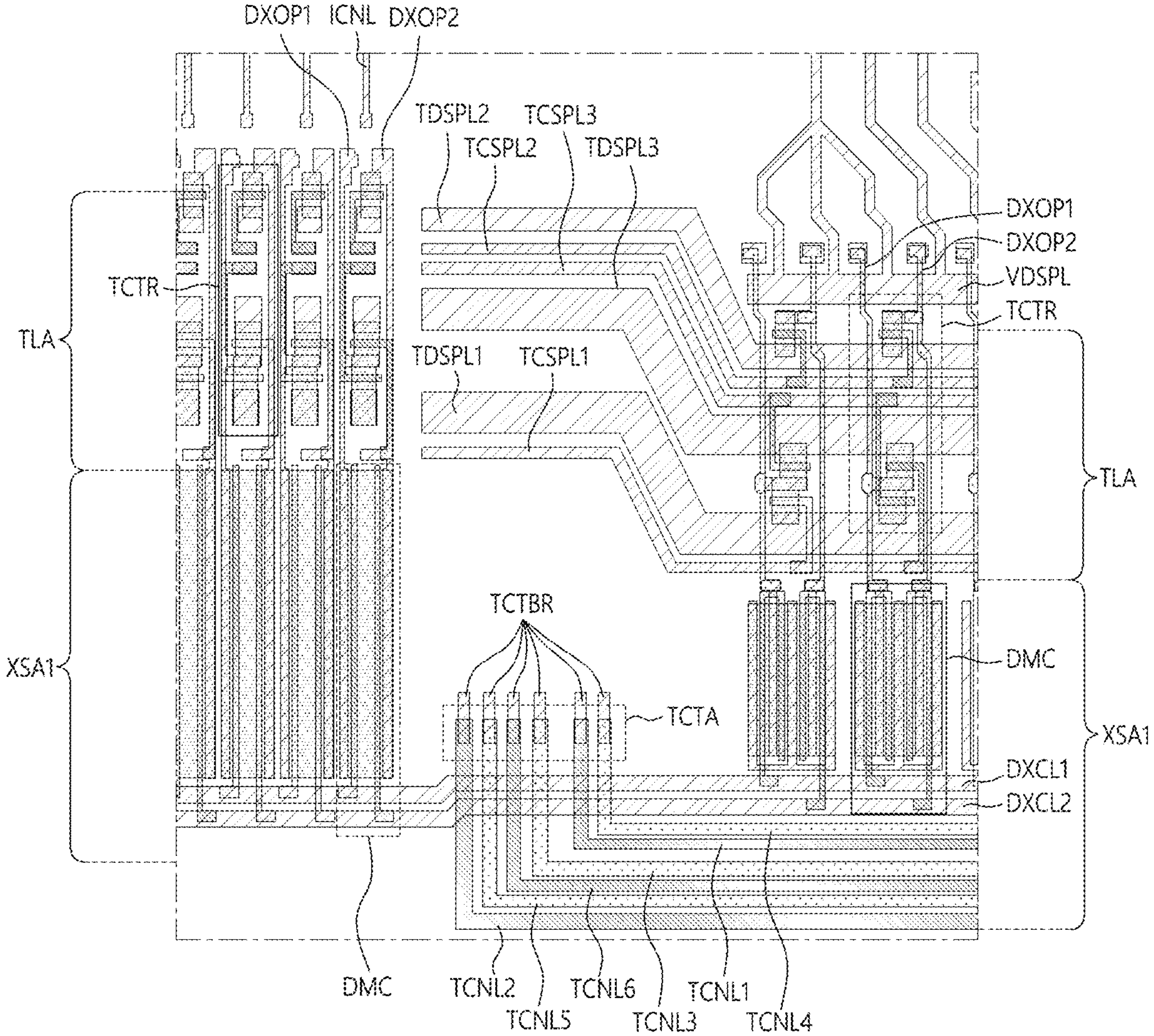
FIG. 19 is a plan view of the semiconductor layer, the first conductive layer, the second conductive layer, and the third conductive layer in FIG. 17 according to some embodiments.
Figure 20:
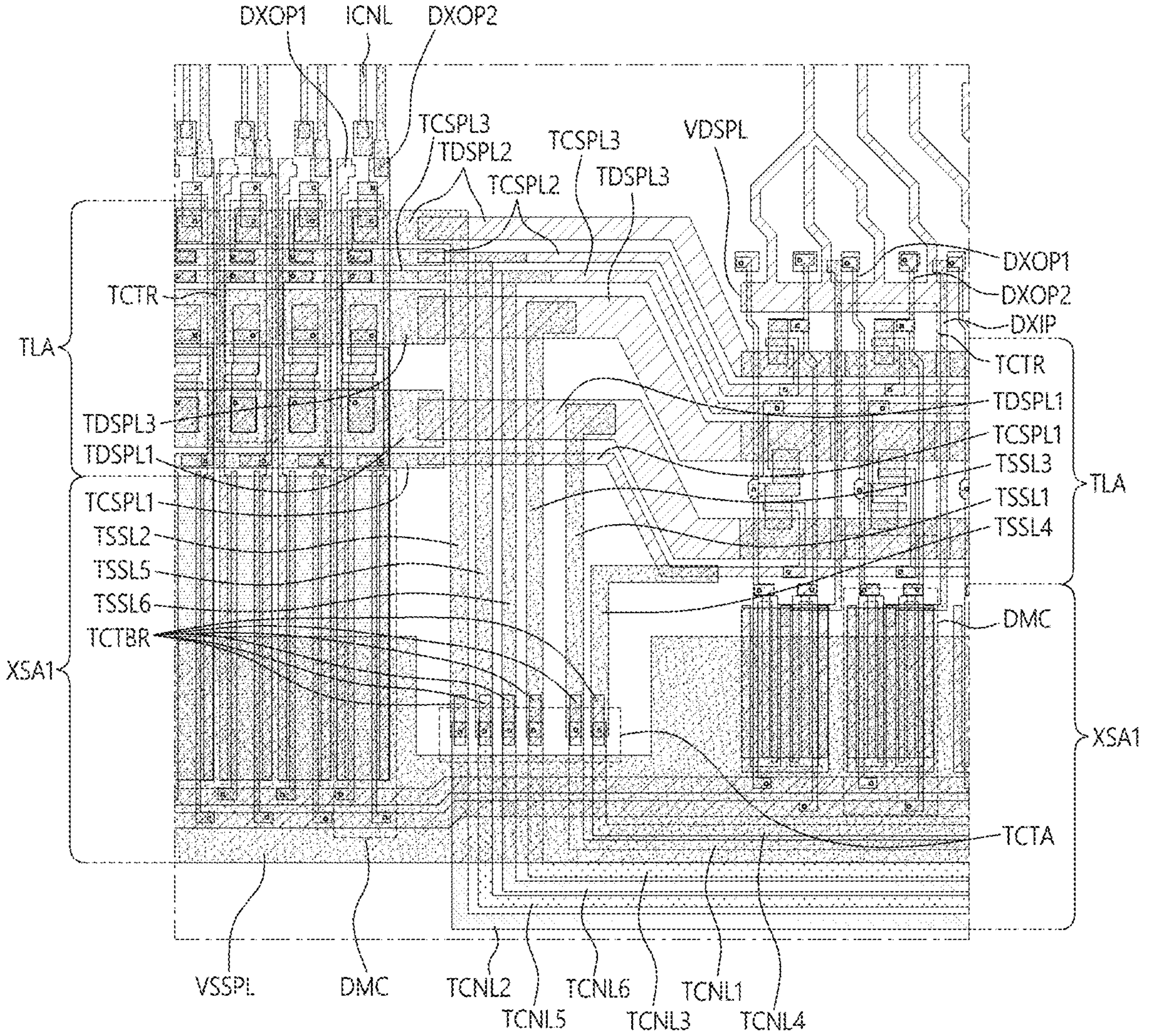
FIG. 20 is a plan view of the semiconductor layer, the first conductive layer, the second conductive layer, the third conductive layer, and the fourth conductive layer in FIG. 17 according to some embodiments.

FIG. 17 is a plan view of an example of a portion of the first demux side area XSA1 including the test connection area TCTA and a test connection auxiliary area in FIG. 5. FIG. 18 is a plan view of the semiconductor layer SEL, the first conductive layer CDL1, and the second conductive layer CDL2 in FIG. 17. FIG. 19 is a plan view of the semiconductor layer SEL, the first conductive layer CDL1, the second conductive layer CDL2, and the third conductive layer CDL3 in FIG. 17. FIG. 20 is a plan view of the semiconductor layer SEL, the first conductive layer CDL1, the second conductive layer CDL2, the third conductive layer CDL3, and the fourth conductive layer CDL4 in FIG. 17.

As illustrated in FIG. 17, the first demux circuit units DMC1 may be arranged side by side in the first demux side area XSA1 of the demux area DXA, and the test control transistors TCTR may be arranged side by side in the test line area TLA.

As illustrated in FIG. 18, each of the demux circuit units DMC including the first demux circuit units DMC1 may include the first demux transistor DXTR1 and the second demux transistor DXTR2.

The first demux transistor DXTR1 may include a first demux channel DXTC1, a demux source DXTS connected to a side of the first demux channel DXTC1, a first demux drain DXTD1 connected to the other side of the first demux channel DXTC1, and a first demux gate DXTG1 overlapping the first demux channel DXTC1.

The second demux transistor DXTR2 may include a second demux channel DXTC2, the demux source DXTS connected to a side of the second demux channel DXTC2, a second demux drain DXTD2 connected to the other side of the second demux channel DXTC2, and a second demux gate DXTG2 overlapping the second demux channel DXTC2.

That is, the demux source DXTS may be located between the first demux channel DXTC1 and the second demux channel DXTC2.

The demux source DXTS may be the input terminal DXIP of each demux circuit unit DMC to which the data driving signal DDRS of the display driving circuit 200 is input.

Alternatively, as illustrated in FIG. 20, the input terminal DXIP of each demux circuit unit DMC may be electrically connected to the demux source DXTS and may be made of the fourth conductive layer CDL4.

The first demux drain DXTD1 and the second demux drain DXTD2 may be the output terminals DXOP of each demux circuit unit DMC which are electrically connected to two data lines DL, respectively.

Alternatively, as illustrated in FIGS. 18 and 19, the output terminals DXOP of each demux circuit unit DMC may be electrically connected to the first demux drain DXTD1 and the second demux drain DXTD2, respectively, and may be made of the second conductive layer CDL2 (see FIG. 12) or the third conductive layer CDL3 (see FIG. 12).

As illustrated in FIG. 18, the first demux channel DXTC1, the first demux drain DXTD1, the second demux channel DXTC2, the second demux drain DXTD2, and the demux source DXTS may be made of the semiconductor layer SEL (see FIG. 12).

The first demux gate DXTG1 and the second demux gate DXTG2 may be made of the first conductive layer CDL1 (see FIG. 12).

As illustrated in FIG. 19, the first demux control line DXCL1 and the second demux control line DXCL2 may extend in the first direction DR1 and may be made of the third conductive layer CDL3 (see FIG. 12).

The first demux gate DXTG1 may extend in the second direction DR2 and may be electrically connected to the first demux control line DXCL1.

The second demux gate DXTG2 may extend in the second direction DR2 and may be electrically connected to the second demux control line DXCL2.

The circuit layer 120 may further include the input connection lines ICNL electrically connecting the input terminals DXIP of the first demux circuit units DMC1, that is, the demux sources DXTS and the input detour lines DETL of the display area DA.

As illustrated in FIGS. 17 and 19, the input connection lines ICNL may be made of the third conductive layer CDL3 (see FIG. 12) or the fifth conductive layer CDL5 (see FIG. 13).

The input connection lines ICNL may be electrically connected to the demux sources DXTS or the demux input terminals DXIP and may extend to the display area DA.

As mentioned earlier with reference to FIG. 2, the emission areas EA of the display device 10 according to some embodiments may include the first emission areas EA1 emitting light of the first color, the second emission areas EA2 emitting light of the second color in a wavelength band lower than that of the first color, and the third emission areas EA3 emitting light of the third color in a wavelength band lower than that of the second color.

Because the first color, the second color, and the third color correspond to different wavelength bands, driving currents for expressing the first color, the second color, and the third color may be different from each other.

Accordingly, as illustrated in FIGS. 17 and 20, the test signal main lines TSML of the test signal supply lines TSSPL according to some embodiments may include a first test data supply line TDSPL1 transmitting a first test data signal for testing the lighting of the first emission areas EA1, a second test data supply line TDSPL2 transmitting a second test data signal for testing the lighting of the second emission areas EA2, a third test data supply line TDSPL3 transmitting a third test data signal for testing the lighting of the third emission areas EA3, a first test control supply line TCSPL1 transmitting a first test control signal for controlling whether to transmit the first test data signal, a second test control supply line TCSPL2 transmitting a second test control signal for controlling whether to transmit the second test data signal, and a third test control supply line TCSPL3 transmitting a third test control signal for controlling whether to transmit the third test data signal.

In this case, as illustrated in FIGS. 17 and 18, the circuit layer 120 according to some embodiments may include first test control transistors TCTR1 corresponding to the first emission areas EA1, second test control transistors TCTR2 corresponding to the second emission areas EA2, and third test control transistors TCTR3 corresponding to the third emission areas EA3.

The first test control transistors TCTR1 are located between the data lines DL connected to pixel drivers of the first emission areas EA1 and the first test data supply line TDSPL1 and are turned on by the first test control signal of the first test control line TCSPL1. When the first test control transistors TCTR1 are turned on, first test data of the first test data supply line TDSPL1 may be transferred to the pixel drivers of the first emission areas EA1.

The second test control transistors TCTR2 are located between the data lines DL connected to pixel drivers of the second emission areas EA2 and the second test data supply line TDSPL2 and are turned on by the second test control signal of the second test control line TCSPL2. When the second test control transistors TCTR2 are turned on, second test data of the second test data supply line TDSPL2 may be transferred to the pixel drivers of the second emission areas EA2.

The third test control transistors TCTR3 are located between the data lines DL connected to pixel drivers of the third emission areas EA3 and the third test data supply line TDSPL3 and are turned on by the third test control signal of the third test data control line TCSPL3. When the third test control transistors TCTR3 are turned on, third test data of the third test data supply line TDSPL3 may be transferred to the pixel drivers of the third emission areas EA3.

In addition, as illustrated in FIGS. 17 through 20, the test pad connection lines TCNL electrically connected to the test signal pads TSPD of the sub-area SBA, respectively, and extending to the non-display area NDA may include a first test pad connection line TCNL1 transmitting the first test data signal, a second test pad connection line TCNL2 transmitting the second test data signal, a third test pad connection line TCNL3 transmitting the third test data signal, a fourth test pad connection line TCNL4 transmitting the first test control signal, a fifth test pad connection line TCNL5 transmitting the second test control signal, and a sixth test pad connection line TCNL6 transmitting the third test control signal.

According to some embodiments, the test line connection contact holes TCTH for electrical connection between the test signal supply lines TSSPL and the test pad connection lines TCNL may be located in the test connection area TCTA which is a part of the demux area DXA.

That is, the test connection area TCTA may be located between two demux circuit units DMC among the demux circuit units DMC arranged in the demux area DXA.

In addition, the first demux circuit units DMC1 located in the first demux side area XSA1 relatively adjacent to an edge of the substrate 110 may not be directly connected to the first circuit output lines DCNL1 but may be electrically connected to the first circuit output lines DCNL1 through the input detour lines DETL of the display area DA and the input connection lines ICNL of the first demux side area XSA1. Accordingly, the first circuit output lines DCNL1 may extend to the second demux side area XSA2 instead of the first demux side area XSA1 and may be electrically connected to the input detour lines DETL.

Therefore, because the first circuit output lines DCNL1 are not located in the first demux side area XSA1, the test signal supply lines TSSPL and the test pad connection lines TCNL can be arranged relatively easily. Accordingly, the test connection area TCTA can be provided relatively easily as a part of the first demux side area XSA1 of the demux area DXA.

As illustrated in FIG. 18, the test pad connection lines TCNL may extend to the test connection area TCTA which is a part of the demux area DXA.

The test pad connection lines TCNL may be made of the first conductive layer CDL1 (see FIG. 12) or the second conductive layer CDL2 (see FIG. 12).

As illustrated in FIG. 19, the circuit layer 120 according to some embodiments may further include test connection bridge electrodes TCTBR made of the third conductive layer CDL3 (see FIG. 12) and electrically connected to ends of the test pad connection lines TSPL, respectively.

The test connection bridge electrodes TCTBR may be located in the test connection area TCTA and may be arranged side by side with each other in the first direction DR1.

As illustrated in FIGS. 19 and 20, the test signal main line TSML of each of the test signal supply lines TSSPL may be made of the third conductive layer CDL3 (see FIG. 12) or the fourth conductive layer CDL4 (see FIG. 13).

As illustrated in FIG. 20, the test signal supply lines TSSPL may include a first test signal sub-line TSSL1 electrically connecting the first test data supply line TDSPL1 and the first test pad connection line TCNL1, a second test signal sub-line TSSL2 electrically connecting the second test data supply line TDSPL2 and the second test pad connection line TCNL2, a third test signal sub-line TSSL3 electrically connecting the third test data supply line TDSPL3 and the third test pad connection line TCNL3, a fourth test signal sub-line TSSL4 electrically connecting the first test control supply line TCSPL1 and the fourth test pad connection line TCNL4, a fifth test signal sub-line TSSL5 electrically connecting the second test control supply line TCSPL2 and the fifth test pad connection line TCNL5, and a sixth test signal sub-line TSSL6 electrically connecting the third test control supply line TCSPL3 and the sixth test pad connection line TCNL6.

The first test signal sub-line TSSL1, the second test signal sub-line TSSL2, the third test signal sub-line TSSL3, the fourth test signal sub-line TSSL4, the fifth test signal sub-line TSSL5, and the sixth test signal sub-line TSSL6 may be made of the fourth conductive layer CDL4 (see FIG. 13) and may extend in the second direction DR2.

In the test connection area TCTA, the first test signal sub-line TSSL1, the second test signal sub-line TSSL2, the third test signal sub-line TSSL3, the fourth test signal sub-line TSSL4, the fifth test signal sub-line TSSL5, and the sixth test signal sub-line TSSL6 may be electrically connected to the test pad connection lines TCNL through the test connection bridge electrodes TCTBR, respectively.

In addition, as illustrated in FIGS. 19 and 20, the first power supply line VDSPL may be made of the third conductive layer CDL3 (see FIG. 12) or the fifth conductive layer CDL5 (see FIG. 13). Alternatively, according to some embodiments, the first power supply line VDSPL may partially have a stacked structure of at least one of the third conductive layer CDL3 (see FIG. 12), the fourth conductive layer CDL4 (see FIG. 13), or the fifth conductive layer CDL5 (see FIG. 13).

The second power supply line VSSPL may be made of the fourth conductive layer CDL4 (see FIG. 13) or the fifth conductive layer CDL5 (see FIG. 13).

That is, the second power supply line VSSPL may partially have a stacked structure of at least one of the fourth conductive layer CDL4 (see FIG. 13) or the fifth conductive layer CDL5 (see FIG. 13).

A portion of the second power supply line VSSPL may be located in the demux area DXA. Accordingly, a portion of each of the demux circuit units DMC, the first demux control line DXCL1, and the second demux control line DXCL2 may overlap the second power supply line VSSPL.

In addition, because the test connection area TCTA is provided as a part of the first demux side area XSA1 of the demux area DXA, the test line connection contact holes TCTH located in the test connection area TCTA may overlap the second power supply line VSSPL.

As described above, according to some embodiments, the test line connection contact holes TCTH for electrical connection between the test signal supply lines TSSPL and the test pad connection lines TCNL are located not in a part of the test line area TLA, but in a part of the first demux side area XSA1 of the demux area DXA.

Therefore, an area allocated to the test pad connection lines TCNL in the non-display area NDA may be reduced, which, in turn, reduces the width of the non-display area NDA.

A display device according to some embodiments includes a substrate including a main area, which includes a display area and a non-display area, and a sub-area protruding from a side of the main area, a circuit layer on the substrate, a light emitting element layer on the circuit layer, and a display driving circuit supplying data driving signals corresponding to data lines of the circuit layer.

The circuit layer includes pixel drivers respectively corresponding to emission areas, the data lines transmitting data signals to the pixel drivers, demux circuit units located in a demux area of the non-display area and electrically connected between the data lines and the display driving circuit, test signal supply lines located in a test line area of the non-display area and respectively transmitting test signals for testing the lighting of light emitting elements, and test pad connection lines electrically connected to test signal pads in the sub-area, respectively.

The test signal supply lines are electrically connected to the test pad connection lines through test line connection contact holes, respectively, and the test line connection contact holes are located in a test connection area which is a part of the demux area adjacent to the sub-area.

Because the display device according to some embodiments includes the demux circuit units connected between the display driving circuit and the data lines as described above, an output terminal of the display driving circuit is not directly connected to the data lines, but is connected to the demux circuit units which are smaller in number than the data lines. Therefore, the number of circuit output lines electrically connected to the display driving circuit and extending to the demux area may be less than the number of data lines. Accordingly, a width of the non-display area can be reduced.

Therefore, because the width of the non-display area can be reduced without a reduction in the number of data lines, resolution limitation due to the reduction in the width of the non-display area can be eliminated.

In addition, because the demux circuit units are electrically connected between the data lines and the display driving circuit, the test connection area adjacent to the sub-area can be easily provided in the demux area of the non-display area by adjusting a distance between the demux circuit units. Accordingly, the test line connection contact holes for electrically connecting the test signal supply lines and the test pad connection lines, respectively, may be located in the test connection area of the demux area. Therefore, even if the test pad connection lines do not extend to both ends of the demux area, they can be electrically connected to the test signal supply lines of the test line area, respectively.

Therefore, because the test pad connection lines do not extend toward edges of the substrate, a width of an area allocated to the arrangement of the test pad connection lines may be reduced, which, in turn, reduces the width of the non-display area.

In addition, according to some embodiments, the demux area may include a demux middle area located in the middle in a first direction, a first demux side area adjacent to an edge of the substrate in the first direction, and a second demux side area located between the demux middle area and the first demux side area in the first direction. The demux circuit units may include a first demux circuit unit located in the first demux side area and a second demux circuit unit located in the second demux side area.

The circuit layer may further include circuit output lines electrically connected to the display driving circuit, an input connection line electrically connected to an input terminal of the first demux circuit unit, and an input detour line located in the display area and electrically connecting the input connection line and a first circuit output line. That is, the input terminal of the first demux circuit unit of the first demux side area adjacent to the edge of the substrate may not be directly electrically connected to the first circuit output line of the display driving circuit, but may be electrically connected to the first circuit output line through the input detour line of the display area and the input connection line electrically connected to the input detour line. Accordingly, the first circuit output line does not extend toward the input terminal of the first demux circuit unit. That is, the first circuit output line may not be located in the first demux side area. Therefore, a width of the first demux side area including a portion bent along the edge of the substrate in the non-display area may be reduced, which, in turn, reduces the width of the non-display area.

Furthermore, because the first circuit output line is not located in the first demux side area, the test connection area can be easily provided as a part of the first demux side area only by adjusting a distance between first demux circuit units regardless of the first circuit output line.

However, the characteristics of embodiments according to the present disclosure are not restricted to the characteristics specifically set forth herein. The above and other characteristics of embodiments according to the present disclosure will become more apparent to one of daily skill in the art to which the present disclosure pertains by referencing the claims, and their equivalents.

What is claimed is:

1. A display device comprising:
a substrate comprising:
a main area having a display area in which emission areas are arranged and a non-display area around the display area; and
a sub-area protruding from a side of the main area;
a circuit layer on the substrate;
a light emitting element layer on the circuit layer and comprising light emitting elements in the emission areas, respectively,
wherein the circuit layer comprises:
pixel drivers electrically connected to the light emitting elements, respectively;
data lines configured to transmit data signals to the pixel drivers;
demultiplexer (demux) circuit units arranged side by side in a demux area of the non-display area and electrically connected to the data lines;
test signal supply lines in the non-display area and respectively configured to transmit test signals for testing a lighting state of the light emitting elements; and
test pad connection lines in the sub-area of the substrate, extending to the non-display area, and electrically connected to the test signal supply lines through test line connection contact holes, respectively, and
wherein the demux area includes a test connection area in which the test line connection contact holes are located.

2. The display device of claim 1, further comprising:
a display driving circuit on the sub-area of the substrate and configured to supply data driving signals to the demux circuit units,
wherein the demux circuit units are arranged in a first direction, and
wherein each of the demux circuit units is configured to transmit two or more data signals to two or more data lines from among the data lines, respectively, based on one supply data driving signal of the supply data driving signals.

3. The display device of claim 2, wherein each of the demux circuit units comprises:
an input terminal configured to receive a data driving signal of the display driving circuit;
two or more output terminals configured to output two or more data signals corresponding to the data driving signal, respectively; and
two or more demux transistors electrically connected between the two or more output terminals and the input terminal, respectively, and
wherein the circuit layer further comprises:
output connection lines in the demux area and a test line area of the non-display area, extending in a second direction different from the first direction and electrically connecting the output terminals of the demux circuit units and the data lines, respectively; and
two or more demux control lines electrically connected to gate electrodes of the two or more demux transistors, respectively.

4. The display device of claim 3, wherein the demux area comprises:
a demux middle area in a middle in the first direction;
a first demux side area adjacent to an edge of the substrate in the first direction; and
a second demux side area between the demux middle area and the first demux side area in the first direction,
wherein the demux circuit units comprise:
a first demux circuit unit in the first demux side area; and
a second demux circuit unit in the second demux side area, and
wherein the circuit layer further comprises:
circuit output lines electrically connected to the display driving circuit and extending to the demux area;
an input connection line in the non-display area and electrically connected to the input terminal of the first demux circuit unit; and
an input detour line in the display area and electrically connecting a first circuit output line among the circuit output lines and the input connection line,
wherein a second circuit output line among the circuit output lines is electrically connected to the input terminal of the second demux circuit unit, and
wherein the first circuit output line is adjacent to the second circuit output line in the demux area.

5. The display device of claim 4, wherein the test connection area is a part of the first demux side area and is located between two first demux circuit units.

6. The display device of claim 4,
wherein the data lines extend in the second direction, and
wherein the input detour line comprises:
a first detour line electrically connected to the first circuit output line and extending in the second direction;
a second detour line electrically connected to the first detour line and extending in the first direction; and a third detour line electrically connected to the second detour line and extending in the second direction toward the demux area.

7. The display device of claim 3, wherein the test pad connection lines are electrically connected to test signal pads in the sub-area, wherein each of the test signal supply lines comprises:

a test signal main line in the test line area of the non-display area between the display area and the demux area and extending in the first direction; and a test signal sub-line electrically connected to the test signal main line through a test line auxiliary contact hole, and extending in the second direction, wherein test signal sub-lines of the test signal supply lines electrically connected to the test pad connection lines through the test line connection contact holes, and wherein the test line auxiliary contact hole is located in the test line area.

8. The display device of claim 7, wherein the test signal main line comprises:

a test data supply line configured to transmit a test data signal for a lighting test; and a test control supply line configured to transmit a test control signal for controlling whether to transmit the test data signal, and wherein the circuit layer further comprises:

test control transistors in the test line area, electrically connected between the data lines and the test data supply line, respectively, and configured to be turned on based on the test control signal of the test control supply line.

9. The display device of claim 7, wherein the emission areas comprise:

a first emission area configured to emit light of a first color;

a second emission area configured to emit light of a second color in a wavelength band lower than that of the first color; and a third emission area configured to emit light of a third color in a wavelength band lower than that of the second color, wherein the test signal main line comprises:

a first test data supply line configured to transmit a first test data signal for testing the lighting of the first emission area;

a second test data supply line configured to transmit a second test data signal for testing the lighting of the second emission area;

a third test data supply line configured to transmit a third test data signal for testing the lighting of the third emission area;

a first test control supply line configured to transmit a first test control signal for controlling transmission of the first test data signal;

a second test control supply line configured to transmit a second test control signal for controlling transmission of the second test data signal; and a third test control supply line configured to transmit a third test control signal for controlling transmission of the third test data signal, and wherein the circuit layer further comprises:

a first test control transistor between a data line of the data lines, which is connected to a pixel driver of the first emission area from among the pixel drivers, and the first test data supply line and configured to be turned on by the first test control signal of the first test control supply line;

a second test control transistor between a data line of the data lines, which is connected to a pixel driver of the second emission area from among the pixel drivers, and the second test data supply line and configured to be turned on by the second test control signal of the second test control supply line; and a third test control transistor between a data line of the data lines, which is connected to a pixel driver of the third emission area from among the pixel drivers, and the third test data supply line and configured to be turned on by the third test control signal of the third test control supply line.

10. The display device of claim 9, wherein the test pad connection lines comprise:

a first test pad connection line configured to transmit the first test data signal;

a second test pad connection line configured to transmit the second test data signal;

a third test pad connection line configured to transmit the third test data signal;

a fourth test pad connection line configured to transmit the first test control signal;

a fifth test pad connection line configured to transmit the second test control signal; and a sixth test pad connection line configured to transmit the third test control signal, and wherein the test signal supply lines further comprise:

a first test signal sub-line electrically connecting the first test data supply line and the first test pad connection line;

a second test signal sub-line electrically connecting the second test data supply line and the second test pad connection line;

a third test signal sub-line electrically connecting the third test data supply line and the third test pad connection line;

a fourth test signal sub-line electrically connecting the first test control supply line and the fourth test pad connection line;

a fifth test signal sub-line electrically connecting the second test control supply line and the fifth test pad connection line; and a sixth test signal sub-line electrically connecting the third test control supply line and the sixth test pad connection line.

11. The display device of claim 7, wherein the circuit layer further comprises:

a first power supply line and a second power supply line in the non-display area and configured to respectively transmit a first power voltage and a second power voltage for driving the light emitting elements, wherein a portion of the second power supply line is in the demux area and overlaps a portion of each of the demux circuit units and the demux control lines.

12. The display device of claim 11, wherein the test line connection contact holes overlap the second power supply line.

* * * * *